(12) United States Patent
Abe et al.

(10) Patent No.: US 6,285,634 B1
(45) Date of Patent: Sep. 4, 2001

(54) BIAS VOLTAGE CONTROLLING APPARATUS, INFORMATION REPRODUCING APPARATUS AND INFORMATION RECORDING APPARATUS

(75) Inventors: Shinichiro Abe; Takayuki Iijima; Minoru Yoshioka, all of Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/684,332

(22) Filed: Oct. 10, 2000

(30) Foreign Application Priority Data

Oct. 7, 1999 (JP) .................................................. 11-286578

(51) Int. Cl.$^7$ ........................................................ G11B 7/00
(52) U.S. Cl. .................................... 369/44.11; 369/44.26; 369/53.2; 369/53.28
(58) Field of Search ............................... 369/44.25, 44.34, 369/44.35, 44.27, 47.22, 47.25, 53.23, 53.28

(56) References Cited

U.S. PATENT DOCUMENTS

| | | | |
|---|---|---|---|
| 5,414,682 | * 5/1995 | Iida | 369/44.25 |
| 5,463,602 | * 10/1995 | Oka et al. | 369/44.35 |
| 5,475,664 | * 12/1995 | Shimizume et al. | 369/44.34 |
| 5,751,674 | * 5/1998 | Bradshaw et al. | 369/44.35 |
| 6,061,318 | * 5/2000 | Hwang | 369/44.25 |
| 6,111,829 | * 8/2000 | Lee | 369/44.25 |
| 6,147,946 | * 11/2000 | Yamada et al. | 369/44.25 |

* cited by examiner

*Primary Examiner*—Nabil Hindi
(74) *Attorney, Agent, or Firm*—Sughrue, Mion, Zinn, Macpeak & Seas, PLLC

(57) ABSTRACT

A bias voltage controlling apparatus controls a bias voltage for a focus servo control to control a position of a focal point of a light beam, which is irradiated onto an information record surface of an information record medium, in a direction perpendicular to the information record surface. The bias voltage controlling apparatus is provided with: a distinguishing device for distinguishing a type of the information record medium; and a controlling device for optimally controlling the bias voltage on the basis of the type of the information record medium distinguished by the distinguishing device.

7 Claims, 14 Drawing Sheets

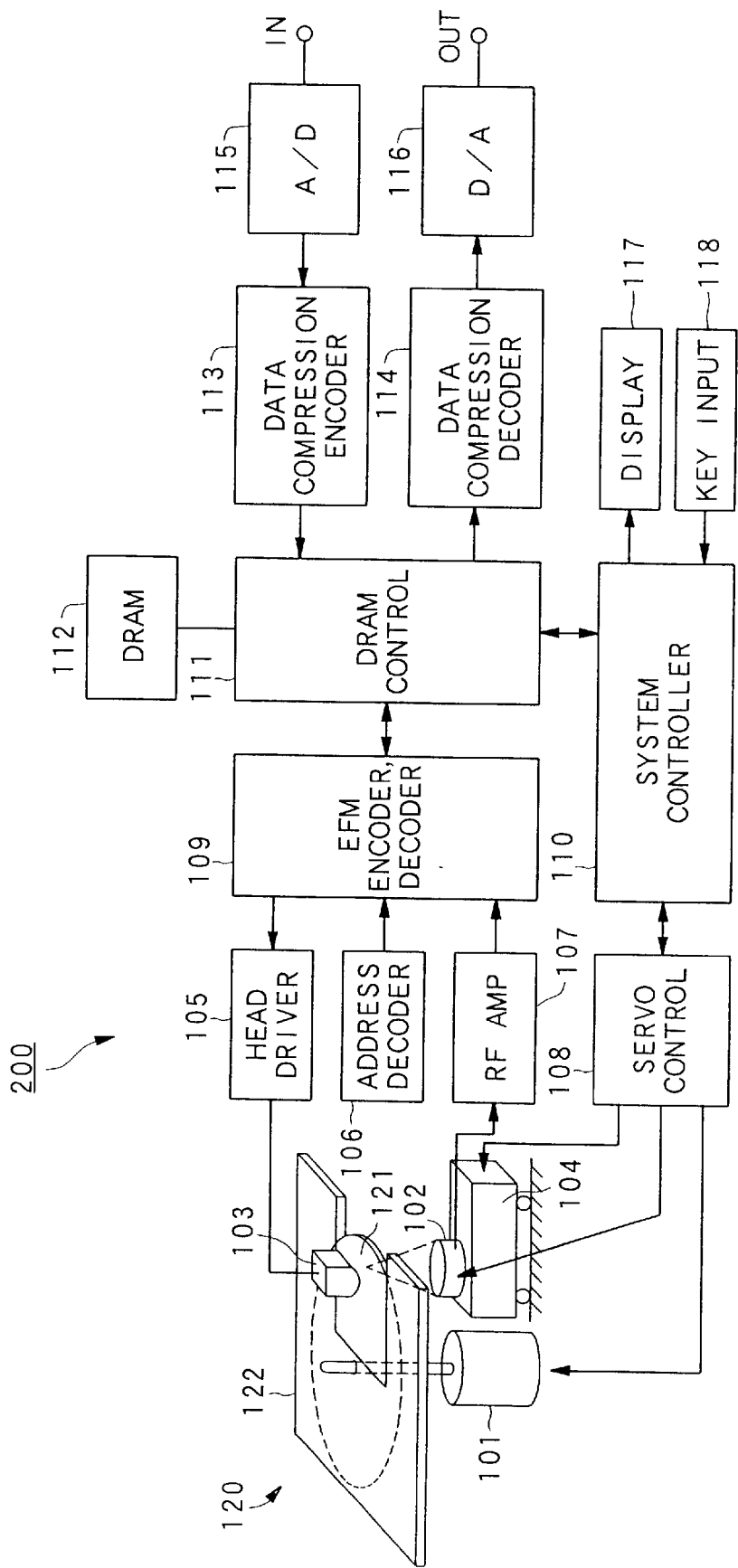

RELATIONSHIP BETWEEN
ERROR AMOUNT AND ERROR VOLTAGE

RELATIONSHIP BETWEE NFOCUS ERROR SIGNAL AND THE VALUE OF $(G_0 \times G_5)$

BIAS VOLTAGE CONTROLLING APPARATUS, INFORMATION REPRODUCING APPARATUS AND INFORMATION RECORDING APPARATUS

BACKGROUND OF THE INVENTION

1. Field of the Invention

The present invention generally relates to a bias voltage controlling apparatus, an information reproducing apparatus and an information recording apparatus including such a bias voltage controlling apparatus. More particularly, the present invention relates to a bias voltage controlling apparatus for controlling a bias voltage in a focus servo control for controlling a focal point of a light beam when optically recording or reproducing information with respect to an information record surface of an information record medium, and an information reproducing apparatus and an information recording apparatus including such a bias voltage controlling apparatus.

2. Description of the Related Art

When optically recording or reproducing information with respect to an information record medium such as an optical disc, it is necessary to make a focal point of a light beam, such as a laser light for recording or reproducing the information, accurately coincident with a position on an information track of an information record surface of the information record medium.

At this time, as a positional control of the focal point, there are a positional control in a direction perpendicular to the information record surface and a positional control in a direction parallel to the information record surface. Among them, the positional control in the direction perpendicular to the information record surface is often performed by a so-called focus servo control.

Here, as a method of performing the focus servo control, there is a so-called astigmatic method or a so-called Foucault method. In either of these methods, a so-called S curve as shown in FIG. 14 is obtained as a focus error signal $S_{FE}$ on the basis of a reflection light of a light beam from an information record medium, and the position of the focal point of the light beam is made coincident with the position of the information record surface by moving an objective lens in a direction perpendicular to the information record surface by an actuator etc., so that the focus error signal $S_{FE}$ becomes "0" when a servo loop of a focus servo for this S curve (i.e., the focus error signal $S_{FE}$) is in a servo close condition.

At this time, the S curve shown in FIG. 14 is obtained as follows. Namely, in case of the focus servo control by means of the astigmatic method for example, the reflection light of the light beam, to which an astigmatism is given, is received or detected by a four divided light detector. Then, a difference between (i) a signal obtained by adding detection signals of two light-detecting portions on one diagonal line of the four divided light detector and (ii) a signal obtained by adding detection signals of two light-detecting portions on another diagonal line of the four divided light detector is calculated. Such an S curve calculated as the difference has an output voltage corresponding to a focus error amount of the focal position with respect to the information record surface.

By the way, in an optical disc reproducing apparatus or an optical disc recording apparatus (which is simply referred to as an "optical disc reproducing apparatus etc.," hereinafter), there may be such a case that the output of the focus error signal $S_{FE}$ does not become "0" although the focal point of the light beam and the information record surface are coincident with each other as shown in an upper half portion of FIG. 14 (i.e., although it corresponds to a point there the error amount is "0" on the graph shown in the upper half portion of FIG. 14), due to an adjustment drift at the initial time (at the time of manufacturing) with respect to the optical system (e.g., a light detector, a beam splitter, a ¼λ plate and the like) included in the optical disc reproducing apparatus etc., and/or due to the difference in the sensitivity between the 4 light receiving elements of the 4 divided type light detector (although the sensitivities thereof are originally the same to each other but may be different from each other later due to an aged deterioration or the like).

Here, the adjustment at the initial time with respect to the optical system is to adjust the optical axis, the angle or the like of each constitutional elements of the optical system so that a reflection light of a light beam from the optical disc becomes circle on the light receiving surface of the light detector for receiving the reflection light when the focal point of the light beam is positioned on the information record surface, at the time of manufacturing the apparatus. Then, in the actual optical disc reproducing apparatus etc., since there is a certain limit of the accuracy in the adjustment for the optical system, there may be a case that the output of the focus error signal $S_{FE}$ does not become "0" although the focal point of the light beam is positioned on the information record surface (i.e., the level of the RF (Radio Frequency) signal $S_{RF}$ which is the output signal of the light detector is the maximum in a lower half portion of FIG. 14).

In addition, such a phenomenon that the output of the focus error signal $S_{FE}$ does not become "0" although the focal point of the light beam is positioned on the information record surface may appear outstandingly in a CD (Compact Disc) player of on-vehicle-type. In this case, since an accurate focus error signal $S_{FE}$ corresponding to the RF signal $S_{RF}$ cannot be obtained, it is difficult or impossible to perform an accurate focus servo control, resulting in the degradation of the S/N (Signal/Noise) ratio. Thus, it is difficult or impossible to perform an accurate information reproduction.

Therefore, in case that the shift of the S curve is generated as shown in the upper half portion of FIG. 14 (the drift between the focal point and the position of the objective lens where the level of the S curve becomes "0" is generated), it is important to superimpose an appropriate bias voltage onto the S curve so that the focal point (the position where the level of the RF signal $S_{RF}$ becomes the maximum) and the position of the objective lens where the level of the S curve becomes "0" are coincident with each other.

Then, as a method of detecting this appropriate bias voltage, there is a method of detecting a bias voltage at which the voltage level of the RF signal $S_{RF}$ becomes the maximum, and then setting this detected bias voltage as an appropriate bias voltage, to thereby perform the focus servo control by using this set bias voltage.

On the other hand, there is a so called MD (Mini Disc) as a small-sized and light-weighted optical disc. As such a MD, there are a so called pre-mastered MD (Music MD) exclusive for reproducing and a so called recordable MD capable of recording for a user.

However, in case of reproducing the pre-mastered MD, if the bias voltage is set so that the level of the RF signal $S_{RF}$ becomes the maximum, the change on the time axis of the component included in the RF signal $S_{RF}$ (hereinafter, it is referred to as "jitter on the time axis" or simply "jitter")

becomes the minimum, and further the allowable width of the change of the positional relationship between the optical elements in the apparatus due to the aged deterioration and the allowable width of the aged deterioration of the bias voltage which is set once in advance (those allowable width will be collectively called as "mechanical allowable width") becomes the maximum. On the other hand, in case of reproducing the information recorded on the recordable MD, if the bias voltage is set so that the level of the RF signal $S_{RF}$ becomes the maximum, the jitter included in the RF signal $S_{RF}$ is increased and the mechanical allowable width is decreased, which is a problem.

The increase of the jitter in the RF signal $S_{RF}$ means that, if a binary coding is performed by a threshold judgment to reproduce the recorded digital value from the RF signal $S_{RF}$, the change on the time axis of the rising up timing or falling down timing of the RF signal $S_{RF}$ is increased, resulting in such a problem that the digital value cannot be correctly reproduced.

Further, this problem due to the jitter becomes more serious as the change due to the aged deterioration increases than the problem caused by the fact that the level of the RF signal $S_{RF}$ does not become the maximum, to thereby bring about an erroneous detection of the digital value.

SUMMARY OF THE INVENTION

It is therefore an object of the present invention to provide a bias voltage controlling apparatus, which can improve the quality of the recorded or reproduced information regardless of the type of the information record medium, and also an information recording apparatus having such a bias voltage controlling apparatus, as well as an information reproducing apparatus having such a bias voltage controlling apparatus.

The above object of the present invention can be achieved by a bias voltage controlling apparatus for controlling a bias voltage for a focus servo control to control a position of a focal point of a light beam, which is irradiated onto an information record surface of an information record medium, in a direction perpendicular to the information record surface. The bias voltage controlling apparatus is provided with: a distinguishing device such as a system controller for distinguishing a type of the information record medium; and a controlling device such as a servo control circuit for optimally controlling the bias voltage on the basis of the type of the information record medium distinguished by the distinguishing device.

According to the bias voltage controlling apparatus of the present invention, since the type of the information record medium is distinguished or judged by the distinguishing device, and since the bias voltage is optimally controlled on the basis of the judgment result, it is possible to improve the quality of the reflection light signal detected from the information record medium of each type.

Therefore, even if there are a plurality of types of information record mediums, it is possible to improve the information recording quality or the information reproducing quality by improving the reflection light signal in any case.

In one aspect of the bias voltage controlling apparatus of the present invention, the controlling device controls the bias voltage so as to reduce a change of a reflection light signal, which is generated in correspondence with a reflection light of the light beam reflected from the information record surface, on a time axis on the basis of the type of the information record medium distinguished by the distinguishing device.

According to this aspect, since the type of the information record medium is distinguished by the distinguishing device, and since the bias voltage is controlled so as to reduce the change of the reflection light signal on the time axis on the basis of the judgment result, it is possible to improve the quality of the reflection light signal detected from the information record medium of each type.

In this aspect, the controlling device may be provided with: a first controlling device such as a servo control circuit for controlling the bias voltage so as to maximize a level of the reflection light signal; and a second controlling device such as a servo control circuit for controlling the bias voltage so as to reduce the change of the reflection light signal on the time axis, on the basis of the type of the information record medium distinguished by the distinguishing device, after the level of the reflection light signal is maximized by the first controlling device.

By constituting in this manner, since the bias voltage is controlled again to reduce the change of the reflection light signal on the time axis on the basis of the judgment result after the bias voltage is once controlled to maximize the level of the reflection light signal, it is possible to further improve the quality of the reflection light signal.

Alternatively in this aspect, the controlling device may be provided with: a setting device for setting a control target value for a control of the bias voltage so as to reduce the change of the reflection light signal on the time axis, in correspondence with the type of the information record medium distinguished by the distinguishing device; and a convergence controlling device for controlling the bias voltage so as to converge the bias voltage to the set control target value.

By constituting in this manner, since the control target value is set so as to reduce the change of the reflection light signal on the time axis, and since the bias voltage is controlled to directly realize this control target value, it is possible to promptly control the bias voltage, to thereby improve the quality of the reflection light signal.

Further in this aspect, the controlling device may control the bias voltage so as to minimize the change of the reflection light signal on the time axis.

By constituting in this manner, it is possible to improve the quality of the reflection light signal at the most.

In another aspect of the bias voltage controlling apparatus of the present invention, the distinguishing device judges whether the type is an exclusive for reproduction type or a recordable type.

According to this aspect, it is possible to improve the quality of the reflection light signal even if the information record medium is exclusive for reproduction or recordable.

In this aspect, the information record medium may be an optical disc exclusive for reproduction or a recordable optical disc.

In this case, it is possible to improve the quality of the reflection light signal even if the information record medium is the optical disc exclusive for reproduction such as a pre-mastered MD or the recordable optical disc such as a recordable MD.

The above object of the present invention can be also achieved by an information reproducing apparatus provided with (i) the above described bias voltage controlling apparatus of the present invention (including its various aspects), (ii) a light emitting device such as an optical pickup for emitting the light beam onto the information record surface in accordance with the controlled bias voltage, and (iii) a reproducing device such as an EFM encoder/decoder for reproducing information recorded on the information record surface on the basis of the reflection light signal.

According to the information reproducing apparatus of the present invention, it is possible to improve the quality of the reflection light signal by optimally controlling the bias voltage and to thereby improve the quality of the reproduced information.

The above object of the present invention can be also achieved by an information recording apparatus provided with (i) the above described bias voltage controlling apparatus of the present invention (including its various aspect), and (ii) a recording device such as an EFM encoder/decoder for emitting the light beam, which corresponds to record information to be recorded, onto the information record surface in accordance with the controlled bias voltage, to thereby record the record information onto the information record surface.

According to the information recording apparatus of the present invention, it is possible to improve the quality of the reflection light signal by optimally controlling the bias voltage and to thereby improve the quality of the record information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1 is a block diagram of an MD recording and reproducing apparatus as an embodiment of the present invention;

DETAILED DESCRIPTION OF THE PREFERRED EMBODIMENTS

Referring to the accompanying drawings, embodiments of the present invention will be now explained.

The embodiments described hereinafter are embodiments in which the present invention is applied to a bias voltage control for a focus servo in an MD recording and reproducing apparatus capable of reproducing music information etc., from the pre-mastered MD exclusive for reproducing and also capable of recording and reproducing music information etc., with respect to the recordable MD.

(I) First Embodiment

First of all, before explaining the MD recording and reproducing apparatus of the first embodiment, the MD itself on which the music information is recorded or reproduced by the MD recording and reproducing apparatus is explained with reference to FIG. 1 and FIG. 2A to FIG. 2D.

As shown in FIG. 1, an MD 120 as one example of the information record medium is provided with an optical disc main body 121 and a cartridge 122 for protecting the optical disc main body 121.

Here, there are various types of MDs as the MD 120. Hereinafter, the case is explained as for the MD recording and reproducing apparatus capable of recording and reproducing the music information with respect to (i) the pre-mastered MD on which the music information or the like is recorded in advance and (ii) the above mentioned recordable MD using the MO (Magneto-Optical) disc. In the following explanation, the details of the recordable MD and the pre-mastered MD are explained at first.

Figure 2A:
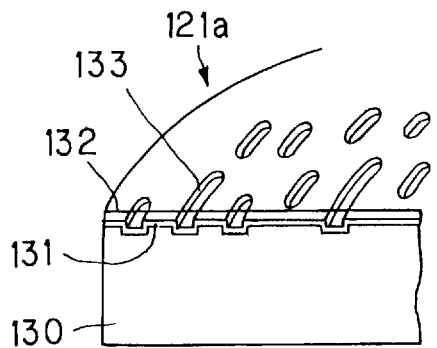
FIG. 2A is a partially broken perspective view of a pre-mastered MD in the embodiment.

As shown in FIG. 2A, an optical disc main body 121a as a pre-mastered MD has a structure similar to that of the CD (Compact Disc), in which a reflection film 131 and a protection film 132 is formed on a substrate 130 made from polycarbonate, and on which a pit array 133 is formed in the same manner as the CD.

The address, which is an absolute address indicative of a record position on the optical disc main body 121a, is recorded in a block header of the data etc., in the same manner as the CD-ROM (CD-Read Only Memory).

In case of such an MD, a portion where the information of any kind is recorded is called as an "information area". In case of the pre-mastered MD, as sown in FIG. 2B, an information area 126 has a lead in area 123 where the table of contents information or the like is recorded, a program area 124 where the music information or the like is actually recorded and a lead out area 125.

Figure 2C:
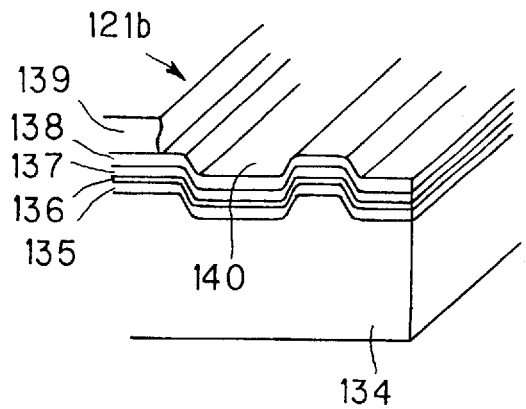
FIG. 2C is a partially broken perspective view of a recordable MD in the embodiment.
Figure 2B:
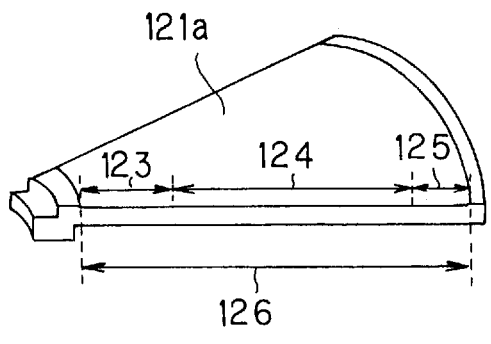
FIG. 2B is a partially broken perspective view of the pre-mastered MD showing its area divisions in the embodiment.

On the other hand, as shown in FIG. 2C, in case of the optical disc main body 121b as the recordable MD, a dielectric film 135, an MO film 136, a dielectric film 137, a reflection film 138 and a protection film 139 are formed on a substrate 134 made from polycarbonate, and further a guide groove 140 which is simply called as a pre-groove is formed.

The guide groove 140 is wobbling at an FM modulated frequency such that the address which is the absolute address indicative of the record position on the optical disc main body 121b is recorded thereon as the change in the aspect of wobbling.

Figure 2D:
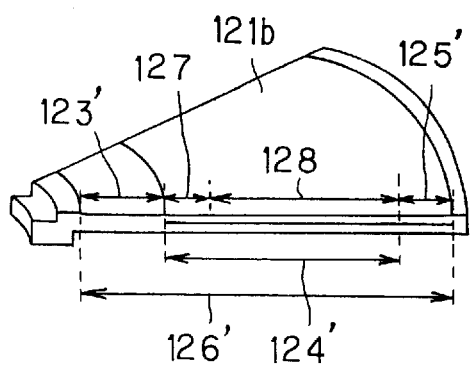
FIG. 2D is a partially broken perspective view of the recordable MD showing its area divisions in the embodiment.

As shown in FIG. 2D, in case of the recordable MD, an information area 126' has: a lead in area 123' where predetermined control information or the like is recorded; a recordable area 124' where music information etc., and the table of contents information, etc., can be recorded; and a lead out area 125' in the same manner as the pre-mastered MD.

Further, the recording area 124' has (i) a UTOC (User Table Of Contents) area 127 where UTOC information including the table of contents information etc., is recorded and (ii) a program area 128 where the music information or the like is actually recorded.

At this time since the guide groove 40 is formed all over the recordable area 124', the address can be read even in case of the recordable MD on which no music information or the like is recorded yet. Furthermore, since the address can be read, it is possible to identify onto which position within the information area 126' the optical pickup irradiates the light beam.

Next, in the above described pre-mastered MD or recordable MD, the optical disc main body 121 is accommodated in the cartridge 122. On the back surface of the cartridge 122, an MD type distinguishable aperture (not illustrated) is formed so as to distinguish the pre-mastered MD and the recordable MD from each other, in addition to an erroneous recording protection aperture (not illustrate) to prevent the MD from being erroneously recorded. At this time, the MD type distinguishable aperture is formed in case of the recordable MD, while the MD type distinguishing aperture is not formed in case of the pre-mastered MD, for example.

Therefore, by detecting the aperture condition of the MD type distinguishable aperture, it is possible to judging whether the MD 120 loaded on the MD recording and reproducing apparatus shown in FIG. 1 is the pre-mastered MD or the recordable MD.

Next, the structure and the operation on the whole of the MD recording and reproducing apparatus, onto which the above described MD 120 can be loaded, will be explained with reference to FIG. 1

As shown in FIG. 1, an MD recording and reproducing apparatus 200 is provided with: a spindle motor 101; an optical pickup 102 as a light irradiating device including an actuator for driving an objective lens (not illustrated), which collects a light beam onto an information record surface of the MD 120; a magnetic head 103; a carriage 104; a head driver circuit 105; an address decoder 106, an RF (Radio Frequency) amplifier 107; a servo control circuit 108 as a controlling device, the first controlling device and the second controlling device; an EFM (Eight to Fourteen Modulation) encoder/decoder 109 as a reproducing device and a recording device; a system controller 110 as a judging device; a DRAM (Dynamic Random Access Memory) control circuit 111; a DRAM 112; a data compression encoder 113; a data compression decoder 114; an A/D convertor 115; a D/A convertor 116; a display unit 117; and a key input unit 118.

Next, a whole operation is explained.

At first, the spindle motor 101 is controlled by the servo control circuit 108 so as to rotate the optical disc main body 121 in the MD 120 at a constant linear velocity.

The optical pickup 102 irradiates the light beam such as a laser light onto the rotated optical disc main body 121, detects the reflection light thereof, generate an RF signal corresponding to the music information etc., recorded on the optical disc main body 121 on the basis of the reflection light, and outputs it to the RF amplifier 107.

Then, the RF amplifier 107 applies a predetermined process such as an amplifying process at a predetermined gain onto this RF signal, and outputs it to the servo control circuit 108 and the EFM encoder/decoder 109.

Here, the principle of taking out the RF signal from the reflection light is explained for each of the above mentioned types of the MDs.

At first, in case of the recordable MD, the digital signals "1" and "0" are recorded by changes of the magnetic polarity N and the magnetic polarity S.

Then, when the light beam is irradiated from the optical pickup 102 onto the information record surface, on which the digital signals are recorded in this manner, because of the magnetic Kerr effect at the MO film 136 of the optical disc main body 121b, the light polarization plane of the reflection light of the light beam is slightly rotated in the forward direction or the reverse direction in correspondence with the changes in the magnetic polarities.

On the other hand, as the reflection light passes through the polarization beam splitter, the distribution amounts of the reflection light to two light receiving elements equipped in the optical pickup 102 are changed in correspondence with the magnetic polarity N and the magnetic polarity S.

Therefore, it is possible to read the digital signal "1" or "0" included in the RF signal at the EFM encoder/decoder 109 etc., by obtaining the difference between the outputs of the two light receiving elements at the RF amplifier 107.

In contrast, in case of the pre-mastered MD, when the light beam is irradiated from the optical pickup 102 onto the pre-mastered MD, the difference in the light reflection amounts is generated due to the diffraction between the portion where the pit is formed and the portion where the pit is not formed, in the same manner as the CD.

Therefore, in this case, it is possible to read the digital signal "1" or "0" included in the RF signal at the EFM encoder/decoder 109 etc., by adding the outputs of the two light receiving elements equipped in the optical pickup 102 and adding them at the RF amplifier 107 and by the largeness or smallness of the result of this addition.

Thus, the RF amplifier 107 has two types of operation amplifiers i.e., one operation amplifier connected so as to obtain the difference of the outputs of the two light receiving elements and another amplifier connected so as to add the outputs of the two light receiving elements.

By such a structure, it is possible to reproduce the pre-mastered MD and the recordable MD as the MD 120 by selecting one of those two operation amplifiers in correspondence with the result of distinguishing the type of the MD 120 loaded onto the MD recording and reproducing apparatus 200.

Next, the address decoder 106 reads the address by detecting the wobbling frequency out of the inputted RF signal at the time of reproducing the recordable MD. By the address decoder 106, it is possible to read the address of the optical disc main body 121b even in the information non-recorded area of the recordable MD, so that it is possible for the system controller 110 etc., to recognize which position on the optical disc main body 121b is irradiated with the light beam by the optical pickup 102.

In case of reproducing the pre-mastered MD, since the address is recorded to the block header etc., of the pre-mastered MD in the same manner as the CD, it is performed to read the address by reading the block header or the like.

On the other hand, the EFM encoder/decoder 109 is a circuit having both functions of the EFM encoder and the EFM decoder.

The EFM encoder/decoder 109 functions as the EFM encoder at the time of recording the music information etc., and encodes the signal to be recorded by means of the EFM method. At this time, with respect to the recordable MD, recording by means of the light modulating method as in the case of the CD-R (CD-Recordable) is not performed but recording by means of the magnetic modulating method is performed. Thus, the EFM modulated signal is supplied to the head driver circuit 105.

The EFM encoder/decoder 109 functions as the EFM decoder at the time of reproducing the music information etc., so as to extract the EFM signal out of the RF signal amplified by the RF amplifier 107 and then decode it.

Further, the head driver circuit 105 is a circuit for driving the magnetic head 103 on the basis of the EFM-modulated record signal (which includes the music information etc., to be recorded on the recordable MD). When the magnetic head 103 is driven, the magnetization due to the magnetic polarity is performed on the basis of the EFM-modulated record signal at a position of the MO film 36 of the recordable MD, which is heated up to a temperature higher that the Curie temperature by the light beam emitted from the optical pickup 102.

Here, in the light modulating method, a so-called "tear shaped pit" may be likely generated, in which the lead portion of the pit where the irradiation of the light beam starts is relatively small while the tail portion of the pit is relatively large. This tear shaped pit may cause a change or fluctuation (i.e., jitter) of the recorded signal on the time axis at the time of reading it out.

In contrast, according to the magnetic modulating method, since the light beam is kept to be irradiated at a constant light intensity, such a symmetrical shape that the magnetic polarity N and the magnetic polarity S are continuously arranged is obtained on the information record surface. This result in an advantage of being less influenced by a tilt of the optical disc main body 121*b*.

Next, the DRAM 112 temporarily stores the music information or the like by an information amount of about 1 Mega Bits, at the time of reproducing and recording the music information or the like. The DRAM 112 is installed so as to prevent the discontinuity of the music sound etc., due to the vibration of the MD recording and reproducing apparatus 200 itself.

Further, the DRAM control circuit 111 controls the input and output of the music information etc., for the DRAM 112 by outputting a predetermined control signal to the DRAM 112.

In this case, at the time of reproducing the music information etc, the data decoded by the EFM encoder/decoder 109 is inputted and written into the DRAM 112. On the other hand, at the time of recording the music information etc., the data is read out from the DRAM 112 and is outputted to the EFM encoder/decoder 109.

At this time, the operation of the DRAM control circuit 111 is controlled by the system controller 110, such that the system controller 110 controls the operation of the DRAM control circuit 111 in synchronization with the recording timing of the music information etc., with respect to the optical disc main body 121*b* and the reproducing timing of the music information etc., from the optical disc main body 121.

Next, the A/D convertor 115 converts the analog information signal inputted from the external at the time of recording the audio information etc., to the digital information signal to be included in the record signal. Here, the sampling frequency of the A/D conversion is 44.1 kHz (kilo Hertz), for example.

By this, the data compression encoder 113 performs a compression of the digital information signal by the ATRAC (Adaptive Transform Acoustic Coding) method. AT this time, by the ATRAC method, the data amount is reduced to about ⅕ such that the A/D converted data are not simply thinned out but are compressed by using the masking effect and the minimum audible characteristic of the sense of hearing of a human being.

On the other hand, the data compression decoder 114 expands the EFM-decoded data read out from the optical disc main body 121 at the time of reproducing the audio information etc., by a method which is the inverse of the ATRAC method, to thereby output the digital audio signal.

Then, the D/A converter 116 converts the reconstructed digital audio signal to an analog signal and outputs it to the external.

In those operations, the carriage 104 moves the optical pickup 102 and the magnetic head 103 in the radial direction of the optical disc main body 121.

The magnetic head 103 is fixed to the optical pickup 102 through an arm etc., and is constructed to move in one body with the optical pickup 102 while sandwiching the optical disc main body 121 with the optical pickup 102. By such a movement, the optical pickup 102 and the magnetic head 103 can be moved to a position opposed to a desired address area on the optical disc main body 121, so that it is possible to certainly reproduce and record the music information etc., with respect to the desired address area.

At this time, the servo control circuit 108 for performing a driving control of the spindle motor 101 or the like performs the servo controls of the carriage 104, the spindle motor 101 as well as the actuator (not illustrated) of the optical pickup 102.

Firstly, the servo control circuit 108 generates a control signal to control an actuator (not illustrated) of the optical pickup 102 and the carriage 104 on the basis of the RF signal from the RF amplifier 107, and performs the tracking servo control so that the irradiation position of the light beam is positioned on the record track axis line of the optical disc main body 121.

Secondly, the servo control circuit 108 generates a control signal to control the actuator (not illustrated) of the optical pickup 102 on the basis of the RF signal, and performs the focus servo control so that the light beam is focused on the information record surface of the optical disc main body 121.

Thirdly, the servo control circuit 108 performs the spindle servo control, by outputting a control signal to rotate the spindle motor 101 at a constant linear velocity on the basis of a clock signal included in the EFM signal from the EFM encoder/decoder 109.

Along with those servo control operations, the system controller 110 controls the operations of each constitutional elements of the MD recording and reproducing apparatus 200. At this time, the system controller 110 controls the MD recording and reproducing apparatus 200 on the whole, and especially controls the focus bias voltage which is described later in detail.

Further, the operation command from the external to command the system controller 110 so as to perform the desirable control operation is inputted by the key input unit 118.

On the basis of the inputted operation command, the system controller 110 outputs the control signals to the respective constitutional elements of the MD recording and reproducing apparatus 200, to thereby control them to perform the fast search operation, the random access reproduction operation and so forth.

The operation condition of the MD recording and reproducing apparatus 200 is displayed by the display unit 117.

Next, the process of setting the bias voltage in the focus servo control, which is performed by the servo control circuit 108 and the system controller 110 in the MD recording and reproducing apparatus 200 of the first embodiment is explained with reference to FIGS. 3A to 3C.

Figure 3A:
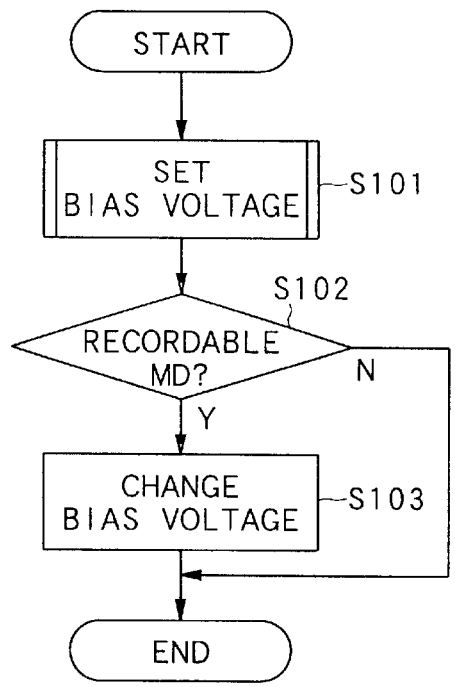
FIG. 3A is a flowchart showing a bias voltage setting process in a first embodiment.
Figure 3B:
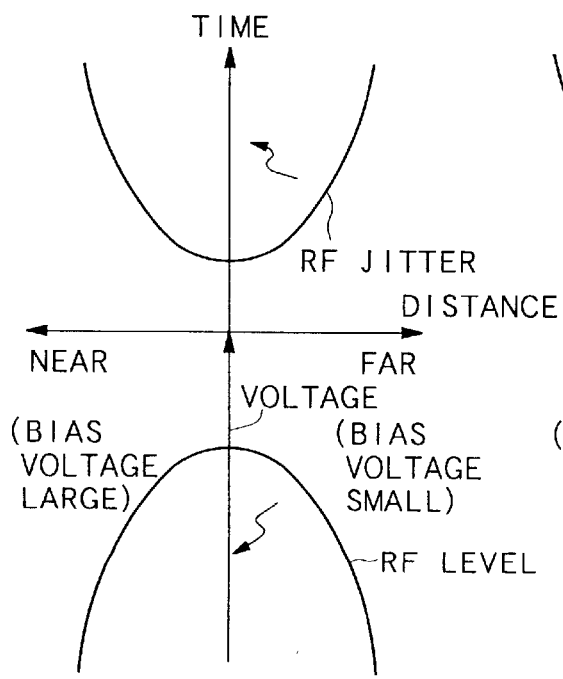
FIG. 3B is a graph showing a relationship between the RF jitter and the RF level in the pre-mastered MD in the first embodiment.
Figure 3C:
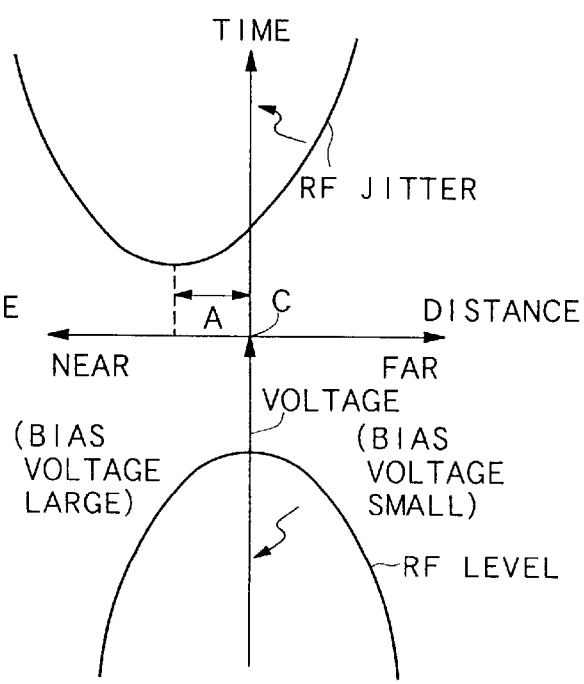
FIG. 3C is a graph showing a relationship between the RF jitter and the RF level in the recordable MD in the first embodiment.
Figure 4:
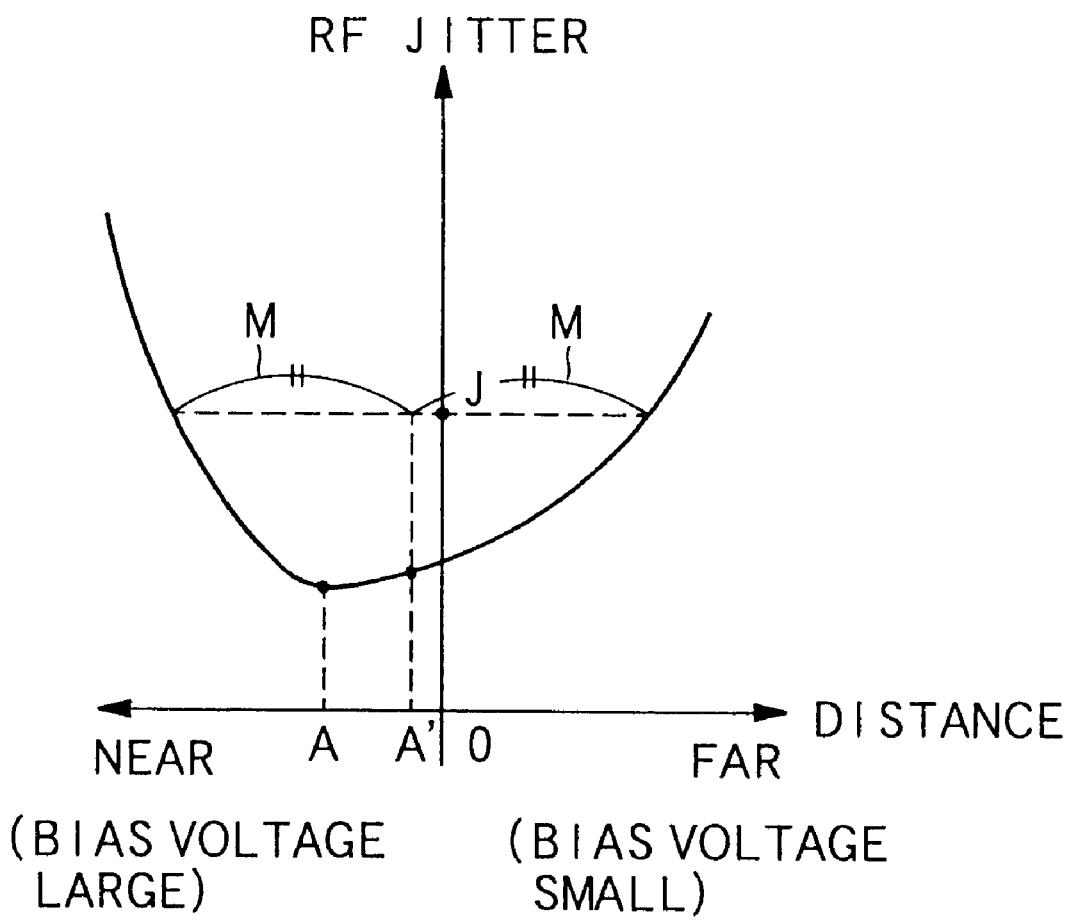
FIG. 4 a diagram for explaining another embodiment of the bias voltage setting process.

As shown in FIG. 3A, in the bias voltage setting process of the first embodiment, the bias voltage is firstly set so as to maximize the level of the RF signal (step S101).

A concrete method of initially setting the bias voltage at this step S101 is described later in the section of "(III) Bias Voltage Setting Process at the step S101" or is disclosed in U.S. Pat. No. 5,751,674 (patented on May 12, 1998 by the assignee same as the present application) especially in its embodiment section and FIG. 3 to FIG. 8, for example. Any known method of initially setting the bias voltage so as to maximize the level of the RF signal may be employed here at the step S101.

Then, it is judged whether the MD 120 loaded in the MD recording and reproducing apparatus 200 is the recordable MD or the pre-mastered MD (step S102).

For example, this judgment is done by detecting the condition of the MD type distinguishable aperture, which is formed in the cartridge 122.

Namely, a sensor for detecting the condition of the MD type distinguishable aperture is equipped in the disc loading portion of the MD recording and reproducing apparatus 200. The system controller 110 distinguishes the type of the loaded MD 120 in accordance with the output of this sensor (such that the type of the loaded MD 120 is judged as the recordable MD if the MD type distinguishable aperture is open, and the type of the loaded MD is judged as the pre-mastered MD if the MD type distinguishable aperture is closed), and outputs the result of distinguishing to the servo control circuit 108.

Then, according to the judgment at the step S102, if the loaded MD 120 is the pre-mastered MD (step S102: NO), since the bias voltage to minimize the jitter included in the RF signal and the bias voltage to maximize the voltage level of the RF signal are supposed to be coincident with each other as shown in FIG. 3B, the focus servo control is performed while using the bias voltage set at the step S101 as it is.

On the other hand, according to the judgment at the step S102, if the loaded MD 120 is the recordable MD (step S102: YES), since the bias voltage to minimize the jitter included in the RF signal and the bias voltage to maximize the voltage level of the RF signal are not usually coincident with each other as shown in FIG. 3C, the bias voltage C set at the step S101 is changed by the voltage A (step S103). Then, the focus servo control is performed while using this changed bias voltage.

The voltage A is set in advance to change the bias voltage set at the step S101 so as to minimize the jitter. Since the jitter changes due to the optical properties of the optical elements in the optical pickup 102, the voltage A is at first experimentally obtained at the time of designing the MD recording and reproducing apparatus 200, and is stored in a memory (not illustrated) within the system controller 1100.

The step S103 is explained separately from the step S101, where the processes in the later described section of "(III) Bias Voltage Setting Process at the step S101" are performed for example. In the MD recording and reproducing apparatus 200, the process of changing the bias voltage may be performed immediately after the step S13 in FIG. 9 in the later described section of (III). After that, the process of starting the reproduction (at the step S14 in FIG. 9 in the later described section (III)) and the process of storing the changed bias voltage (at the step S15 in FIG. 9 in the later described section (III)) are performed, for example.

As described above, according to the bias voltage setting process for the focus servo control in the first embodiment, the type of the MD 120 is judged (whether it is the recordable MD or the pre-mastered MD), and the bias voltage is changed so as to reduce the jitter included in the RF signal on the basis of the judgment result. Thus, it is possible to restrain the generation of the jitter in the RF signal detected from the MD 120 of various types, and also to improve the quality of the RF signal.

Further, since the bias voltage is changed again so as to reduce the jitter after adjusting the bias voltage to minimize the level of the RF signal, it is possible to further improve the quality of the RF signal.

Furthermore, since the bias voltage is changed so that the jitter becomes the minimum value, it is possible to improve the quality of the RF signal at the most.

At the time of reproducing the music information etc., from the MD 120, it is possible to improve the quality of the RF signal by controlling the bias voltage to reduce the jitter, to thereby improve the reproduced music information.

On the other hand, it is possible to improve the accuracy of the focal position control of the light beam in the focus servo control, by controlling the bias voltage to reduce the jitter, to thereby improve the record quality of the music information etc., onto the recordable MD.

Incidentally, in the first embodiment, the bias voltage is changed so as to minimize the jitter included in the RF signal. This is applied to a case where the jitter bias voltage characteristic is symmetrical in the left and right direction as shown in FIG. 3C. For example, if the jitter bias voltage characteristic is not symmetric but is deviated to one side as shown in FIG. 4, the bias voltage is not changed so as to minimize the jitter as described above (as indicated by a reference mark A in FIG. 4). Instead, the bias voltage may be changed in the direction opposite to the direction of the deviation, to be a value (as indicated by a reference mark A' in FIG. 4), which can equalize the aforementioned mechanical allowable widths (each of which is indicated by a reference mark M in FIG. 4) and can reduce the jitter, so that the mechanical allowable widths M related to the bias setting in the direction of the deviation are equalized in the upper and lower sides of the set bias voltage. Namely, in case that the positional relationship of the optical elements in the MD recording and reproducing apparatus 200 is changed due to the aged deterioration or in case that the once set bias voltage is changed, the bias voltage may be changed so that the mechanical allowable widths M, which restrict the generated jitter amount less than the allowable jitter amount J, are equalized on the upper and lower sides of the set bias voltage even as for the positional relationship of optical elements or the bias voltage after the change.

(II) Second Embodiment

Figure 5:
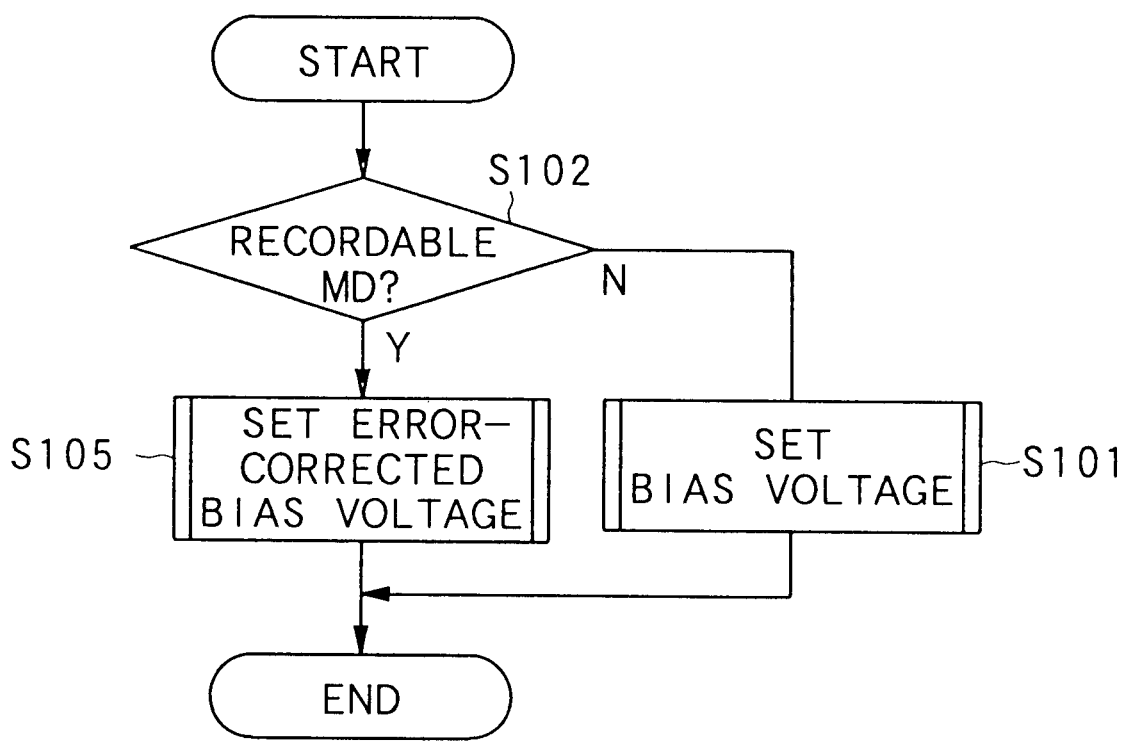
FIG. 5 is a flowchart showing a bias voltage setting process in a second embodiment.

Next, the second embodiment of the present invention is explained with reference to FIG. 5. FIG. 5 is a flowchart showing the bias voltage setting process in the second embodiment.

In the above mentioned bias voltage setting process in the first embodiment, the bias voltage to maximize the level of the RF signal is firstly obtained, and then, the bias voltage appropriate for the reproduction of the music information etc., from the recordable MD is obtained by changing the firstly set bias voltage by the necessary amount. In contrast, in the bias voltage setting process in the second embodiment, the bias voltage setting process itself is changed on the basis of the result of judging the type of the MD 120, so that the bias voltage appropriate for the reproduction of the music information etc., from the recordable MD is directly obtained.

In FIG. 5, the processes same as those in the bias voltage setting process in the first embodiment shown in FIG. 3A carry the same step numbers and the detailed explanations thereof are omitted.

The bias voltage setting process in the second embodiment described hereinafter is performed by the servo control circuit 108 as the setting device and the convergence controlling device, under a control of the system controller 110.

In FIG. 5, the judgment of the type of the MD 120 is performed at first, in the same manner as the first embodiment (step S102).

Then, if the loaded MD 120 is judged to be the premastered MD (step S102: NO), since the bias voltage to maximize the voltage level of the RF signal and the bias voltage to minimize the jitter included in the RF signal are coincident with each other as shown in FIG. 3B, the bias voltage setting process (i.e., the process of setting the bias voltage so as to maximize the level of the RF signal) same as that of the step S101 is performed to set the bias voltage (step S101) and the focus servo control is performed after that.

On the other hand, according to the judgment at the step S102, if the loaded MD 120 is judged to be the recordable MD (step S102: YES), the bias voltage setting process itself is changed.

Figure 10:
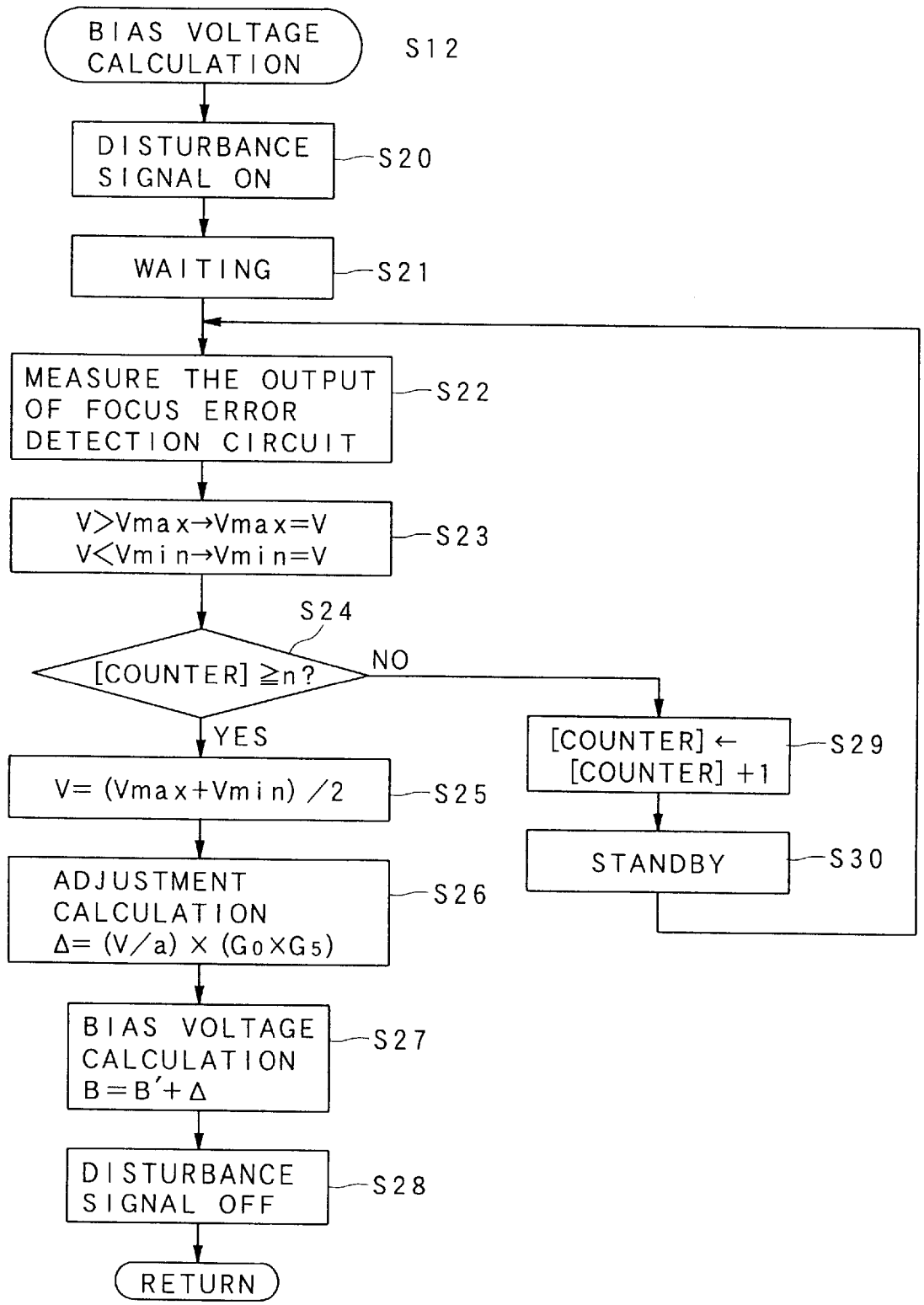
FIG. 10 is a flow chart showing operations at detailed portions of a bias voltage calculating process in the third embodiment.

For example, the process at the step S26 in FIG. 10 in the later described section (III) is changed to a process expressed by a following equation.

$$\Delta' = (V/a) \times (G_0 \times G_5) + B$$

wherein B represents a corrected adjusting amount.

Further for example, the process at the step S27 in FIG. 10 in the later described section (III) is changed to a process expressed by a following equation.

$$B = B' + \Delta'$$

Then, the processes shown in FIG. 9 and FIG. 10 in the later described section (III) are performed to thereby set the bias voltage (step S105). After that, the focus servo control is performed by using the bias voltage, which is set in this manner.

Next, the above mentioned corrected adjusting amount B is explained.

As described above, in the bias voltage setting process in the second embodiment, the bias voltage appropriate for the reproduction of the recordable MD is directly obtained on the basis of the judgment result of the type of the MD 120.

Thus, in the bias voltage setting process in the second embodiment, the adjusting amount calculated by the step S26 in FIG. 10 in the later described section (III), is changed from an adjusting amount $\Delta$, which is to maximize the level of the RF signal, to an adjusting amount $\Delta'$ (=$\Delta$+B), which is to minimize the jitter, in order to directly obtain the bias voltage to minimize the jitter.

Figures 11A, 11B:
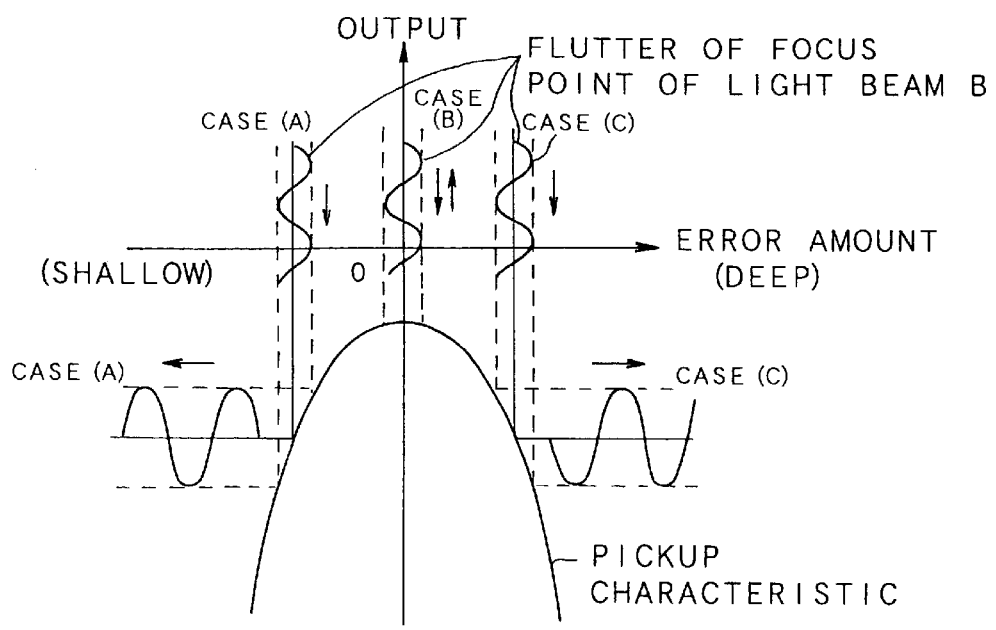
FIG. 11A is a diagram showing a relationship between a focus point and a position of an information record surface and wave forms of various signals to explain an operation of detecting an error amount.
FIG. 11B is a diagram for showing a principle of the operation of detecting the error amount.

At this time, the corrected adjusting amount B corresponds to a target amplitude at which the amplitude of the RF signal $S_{RF}$ shown in FIG. 11B finally arrives. Here, the RF signal $S_{RF}$ is the amplitude of the cyclic change of the signal component included into the RF signal $S_{RF}$ by superimposing the disturbance signal $S_N$ onto it in the later described section (III). The bias voltage is set by the step S101 in FIG. 5 of the present embodiment so that this target amplitude becomes the minimum. This target amplitude is the minimum amplitude which the RF signal $S_{RF}$, onto which the disturbance signal is superimposed, can take in the bias setting process in the step S101 in FIG. 5. In the bias voltage setting process at the step S105 in FIG. 5, the target amplitude becomes larger than this minimum amplitude and corresponds to the bias voltage, which is to be set for the recordable MD.

Then, the corrected adjusting amount B is set in advance so as to obtain the bias voltage, which is to minimize the jitter in the same manner as the voltage A in the above described first embodiment. More concretely, the corrected adjusting amount B is obtained experimentally at the time of designing the MD recording and reproducing apparatus 200 and is stored into the memory (not illustrated) in the system controller 110.

Further, since the bias voltage is adjusted by using the adjusting amount $\Delta'$ including the corrected adjusting amount B, a bias voltage drifted from the bias voltage, which is to maximize the level of the RF signal, by a voltage amount corresponding to the corrected adjusting amount B, is set as the bias voltage set by the processes in the second embodiment.

As described above in detail, according to the bias voltage setting process of the focus servo control in the second embodiment, the type of the MD 120 is judged, and the bias voltage is set so as to reduce the jitter included in the RF signal on the basis of the judgment result, in the same manner as the first embodiment. Thus, it is possible to restrain the generation of the jitter in the RF signal, which is detected from the MD 120 in various types, and to thereby improve the quality of the RF signal.

Since the adjusting amount $\Delta'$ for the bias voltage is set so as to reduce the jitter, and since the bias voltage is controlled so as to directly realize the adjusting amount $\Delta'$, it is possible to improve the quality of the RF signal by promptly controlling the bias signal.

Further, since the bias voltage is changed so as to minimize the jitter, it is possible to improve the quality of the RF signal at the maximum. On the other hand, at the time of reproducing the music information etc., from the MD 120, it is possible to improve the quality of the RF signal by controlling the bias voltage so as to reduce the jitter, and to thereby improve the reproduction quality of the music information etc., which is reproduced from this RF signal.

(III) Bias Voltage Setting Process at the step S101

Next, the above mentioned bias voltage setting process at the step S101 in FIG. 3A and FIG. 5 is explained with reference to FIG. 6 to FIG. 13. The bias voltage setting process here is explained as for an MD reproducing apparatus shown in FIG. 6.

At first, a configuration of an MD reproducing apparatus having an apparatus for controlling a bias voltage of a focus error signal in accordance with this embodiment in order to control a bias voltage as a bias amount of the focus error signal is explained with reference to FIGS. 6 to 8. In the embodiment described below, it is defined that the focus error signal is generated by the astigmatism method.

At first, a whole configuration of the MD reproducing apparatus in accordance with this embodiment is explained with reference to FIG. 6.

Figure 6:
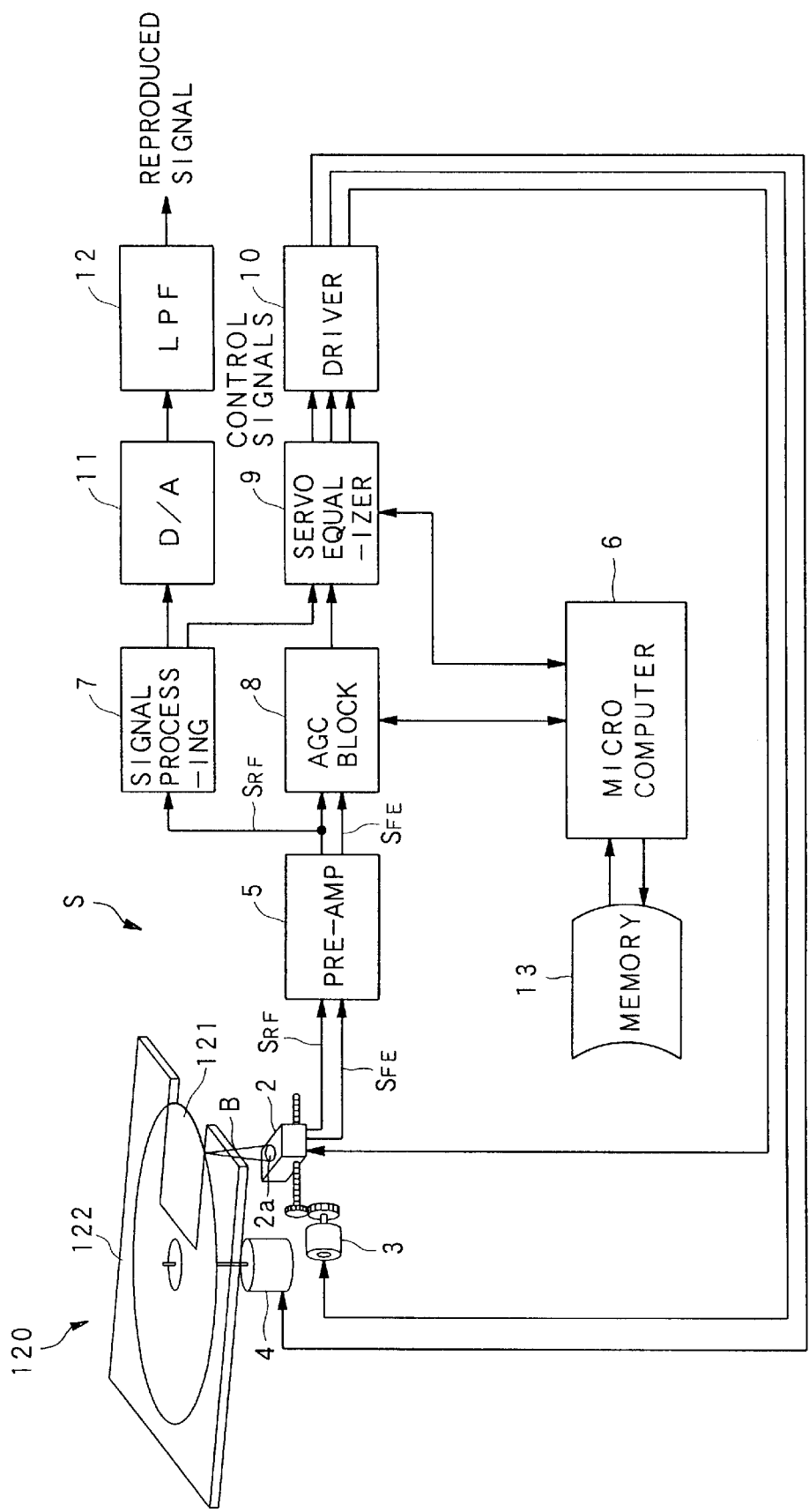
FIG. 6 is a block diagram showing a schematic configuration of an MD reproducing apparatus as a third embodiment of the present invention.

As shown in FIG. 6, an MD reproducing apparatus S for reproducing information recorded on an MD 120 is provided with: an optical pickup 102 for irradiating a light beam B to the MD 120 and also receiving a reflection light thereof and outputting an RF signal $S_{RF}$ corresponding to the information recorded on the MD 120 and further outputting a focus error signal $S_{FE}$ by means of the astigmatism method; a carriage motor 3 for moving the optical pickup 102 in a radial direction of the MD 120; a spindle motor 4 for rotating the MD 120 at a predetermined rotation speed; a preamplifier 5 for respectively amplifying the RF signal $S_{RF}$ and the focus error signal $S_{FE}$ outputted by the optical pickup 102; a signal processing unit 7 for EFM-decoding the amplified RF signal $S_{RF}$ and also performing an error correction of it on the basis of an error correction code, such as a CIRC (Cross Interleave Reed-Solomon Code) and the like, and then outputting it to a D/A converter 11 and a servo equalizer 9 described later; the D/A converter 11 for converting the RF signal $S_{RF}$, which was demodulated and error-corrected, from a digital signal to an analog signal; an LPF (Low Pass Filter) 12 for passing a signal component within an audible frequency band of the RF signal $S_{RF}$ converted into the analog signals, so as to remove noise components, and outputting a reproduction signal such as an audio signal and the like; an automatic gain control (AGC) block 8 constituting the bias voltage controlling apparatus of this embodiment, for setting the bias voltage with respect to the amplified focus error signal $S_{FE}$ and automatically controlling or adjusting a gain in a focus servo loop; the servo equalizer 9 for generating a control signal for the focus servo control on the basis of the RF signal $S_{RF}$, which was demodulated and error-corrected, and the focus error signal $S_{FE}$, to which the bias voltage was set and applied, and further generating control signals for a tracking servo control, a spindle servo control and a carriage servo control; a driver 10 for amplifying and wave-shaping the control signals for the various servo controls outputted by the servo equalizer 9 and further outputting them to the spindle motor 4, the carriage motor 3 and a tracking control actuator and a focus servo control actuator (which are not shown) included in the optical pickup 102; a micro computer 6 for calculating the value of the bias voltage for the focus error signal and further controlling the MD reproducing apparatus S as a whole; and a memory 13 composed of a RAM (Random Access Memory) for example, for storing the value of the set bias voltage.

The optical pickup 102 is provided with: an objective lens 2a for condensing the light beam B onto the information record surface of the MD 120; an optical detector D (refer to FIG. 7) for receiving the reflection light of the light beam B from the MD 120 through the objective lens 2a; the focus servo control actuator (refer to FIG. 8) for driving the objective lens 2a in a direction perpendicular to the information record surface to thereby perform the focus servo control; the tracking servo control actuator (not shown) for driving the objective lens 2a in a direction parallel to the information record surface (and a direction orthogonal to an information track on which the information is recorded) to thereby perform the tracking servo control; and a semiconductor laser; a deflection beam splitter, a quarter wave length plate and the like (which are not shown) for outputting the light beam B.

Figure 7:
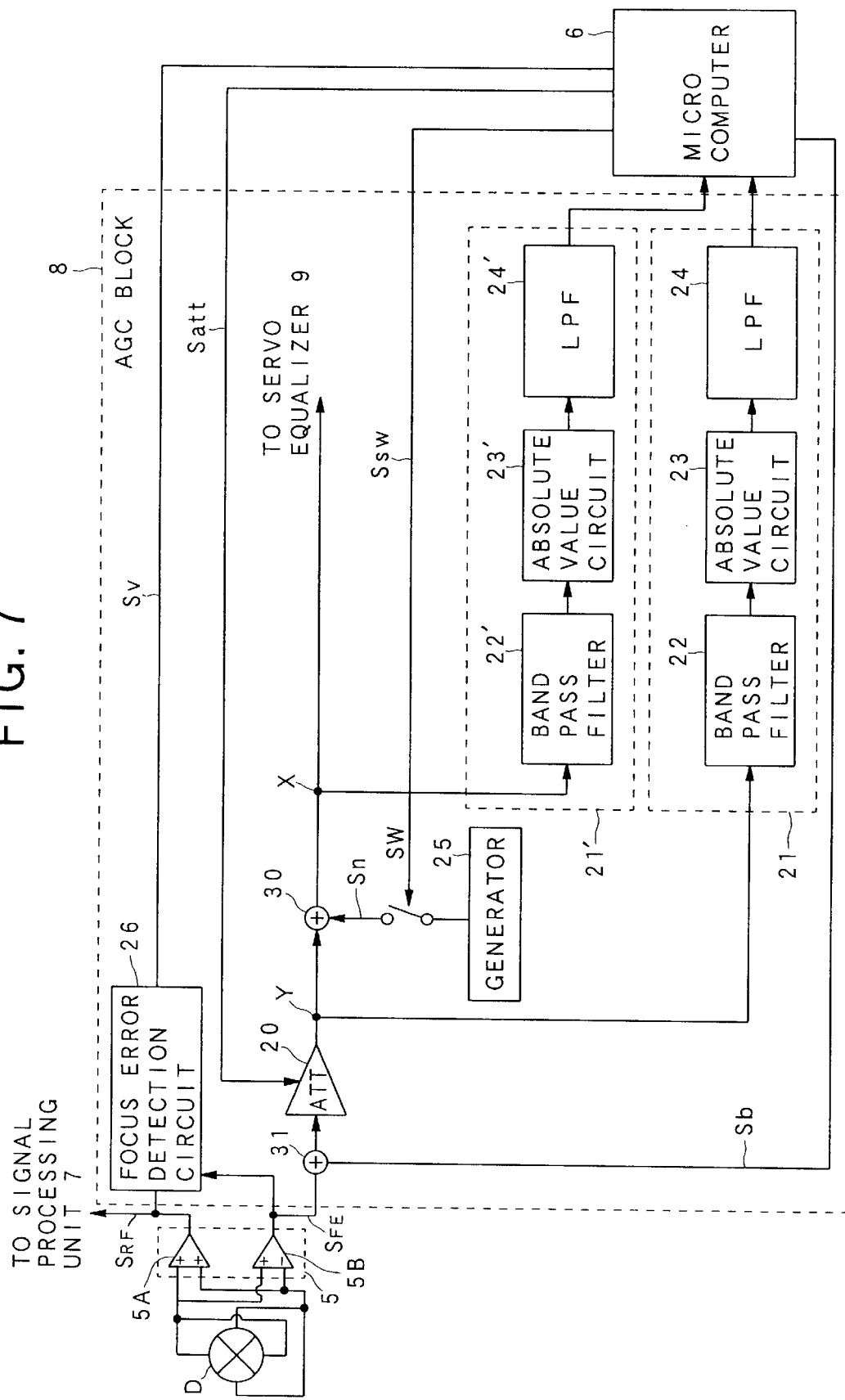
FIG. 7 is a block diagram showing a schematic configuration of an automatic gain control block and peripheral circuits thereof in the third embodiment.

As shown in FIG. 7, the optical detector D is divided into four light-receiving elements, and adds outputs from all the light-receiving elements to thereby output the RF signal $S_{RF}$. The optical detector D further adds detection signals of the light-receiving elements located on diagonal lines in the four-division detector respectively, and then calculates a difference between the added signals to thereby output the focus error signal $S_{FE}$.

Detailed configurations of the pre-amplifier 5 and the automatic gain control block 8 are explained with reference to FIG. 7. Incidentally, FIG. 7 shows the portions utilized for the focus servo control and the information reproduction among the portions related to the various servo controls and the information reproduction in the MD reproducing apparatus S. Since configurations related to the tracking servo, spindle servo and carriage servo controls are similar to those of the conventional art, illustrations thereof are omitted.

As shown in FIG. 7, the pre-amplifier 5 is provided with a pre-amplifier 5A for adding and amplifying the detection signals outputted by the respective light-receiving elements of the optical detector D to thereby output the RF signal $S_{RF}$, and a pre-amplifier 5B for adding the detection signals of the light-receiving elements located on the diagonal lines of the optical detector D respectively and calculating and amplifying the difference between the added signals to thereby output the focus error signal $S_{FE}$.

Further, as shown in FIG. 7, the automatic gain control block 8 is provided with: a generator 25 for generating an external disturbance signal (for example, a sine wave signal having a frequency of 1 kHz) Sn to be superimposed onto the focus error signal $S_{FE}$ in order to set the bias voltage; an adder 31 for superimposing a bias voltage on the basis of the bias control signal Sb from the micro computer 6, onto the focus error signal $S_{FE}$ outputted by the pre-amplifier 5B; an attenuator 20 for changing and outputting a gain of the focus error signal $S_{FE}$ to adjust the gain such that a loop gain in a focus servo loop described later has a predetermined design value for the focus error signal $S_{FE}$ outputted by the adder 31 (for example, 0 dB at a frequency of 1 kHz and the like) on the basis of a gain control signal Satt from the micro computer 6; a gain change amount detecting unit 21 for detecting a gain change amount in the focus error signal $S_{FE}$, on the basis of one portion of the focus error signal $S_{FE}$ branched from a Y branch (shown by a symbol Y in FIG. 7) provided within a route of the focus servo loop, among the whole portion of the focus error signal $S_{FE}$ on which the disturbance signal Sn is superimposed and which has passed through one round of the focus servo loop described later (refer to FIG. 8); an adder 30 for superimposing the disturbance signal Sn generated by the generator 25 through a switch SW described later, onto the focus error signal $S_{FE}$ passed through the Y branch; a gain change amount detecting unit 21' for detecting a gain change amount in the focus error signal $S_{FE}$ immediately after the disturbance signal Sn is superimposed, on the basis of one portion of the focus error signal $S_{FE}$ branched from a X branch (shown by a symbol X of FIG. 7) provided within the route of the focus servo loop, among the whole portion of the focus error signal $S_{FE}$ outputted by the adder 30; the switch SW for controlling the superimposing process on the focus error signal $S_{FE}$ of the disturbance signal Sn since it is opened and closed on the basis of a switch control signal Ssw from the micro computer 6; and a focus error detection circuit 26 for detecting an error amount from the information record surface of the focus point of the light beam B, on the basis of the RF signal $S_{RF}$ outputted by the pre-amplifier 5A and the focus error signal $S_{FE}$ outputted by the pre-amplifier 5B, and outputting a corresponding error signal Sv.

The gain change amount detecting units 21 and 21' have the configurations similar to each other, and are respectively provided with band pass filters 22 and 22' for passing only a signal component having a frequency equal to that of the disturbance signal Sn, absolute value circuits 23 and 23' for rectifying output signals from the band pass filters 22 and 22' to thereby convert them into absolute value signals, and LPFs 24 and 24' for removing high frequency components from the respective absolute value signals to thereby change them into direct currents.

In the configuration of the automatic gain control block 8, the attenuator 20 and the gain change amount detecting units 21 and 21' are intended to perform an automatic gain control (AGC) in the focus servo loop. The concrete configurations and the detailed operations of these attenuator and the gain change amount detecting units are disclosed in, for example, Japanese Patent Application Laying Open (KOKAI) No. Hei.7-130087, Japanese Patent Application Laying Open (KOKAI) No. Hei.7-141029, Japanese Patent Application Laying Open (KOKAI) No. Hei.7-141666 and the like. Thus, since they are well known in the technical field of the present invention, the explanations of the detailed portions thereof are omitted.

Before explaining a control operation for the bias voltage of the focus error signal $S_{FE}$ in the MD reproducing apparatus S, a principle under which the error from the information record surface of the focus point of the light beam B can be controlled by controlling the bias voltage in the focus servo loop is explained with reference to FIG. 8. FIG. 8 shows a relationship between the respective elements constituting the focus servo loop (i.e., the pre-amplifier 5B, the adder 31, the attenuator 20, the servo equalizer 9, the driver 10, the focus servo control actuator 50 (hereafter, simply referred to as an "actuator") and the whole optical system 100 for outputting the RF signal $S_{RF}$, which includes the optical detector D, the objective lens 2a, the deviation beam splitter, the quarter wave length plate, and so on in the configuration shown in FIGS. 6 and 7) as an automatic control system, and the respective control amounts and gains. In FIG. 8, a symbol "FE2" represents a control amount corresponding to the focus error signal $S_{FE}$ outputted by the pre-amplifier 5B. A symbol "FE3" represents a control amount corresponding to the focus error signal $S_{FE}$ to which the bias voltage (corresponding to a control amount shown by a symbol "B" in FIG. 8) outputted by the adder 31 is applied. A symbol "X" represents a control amount corresponding to a position in a direction perpendicular to the information record surface of the objective lens 2a by means of the operation of the actuator. And, a symbol "FE1" represents a control amount corresponding to the focus error signal $S_{FE}$ outputted by the optical detector D.

Figure 8:
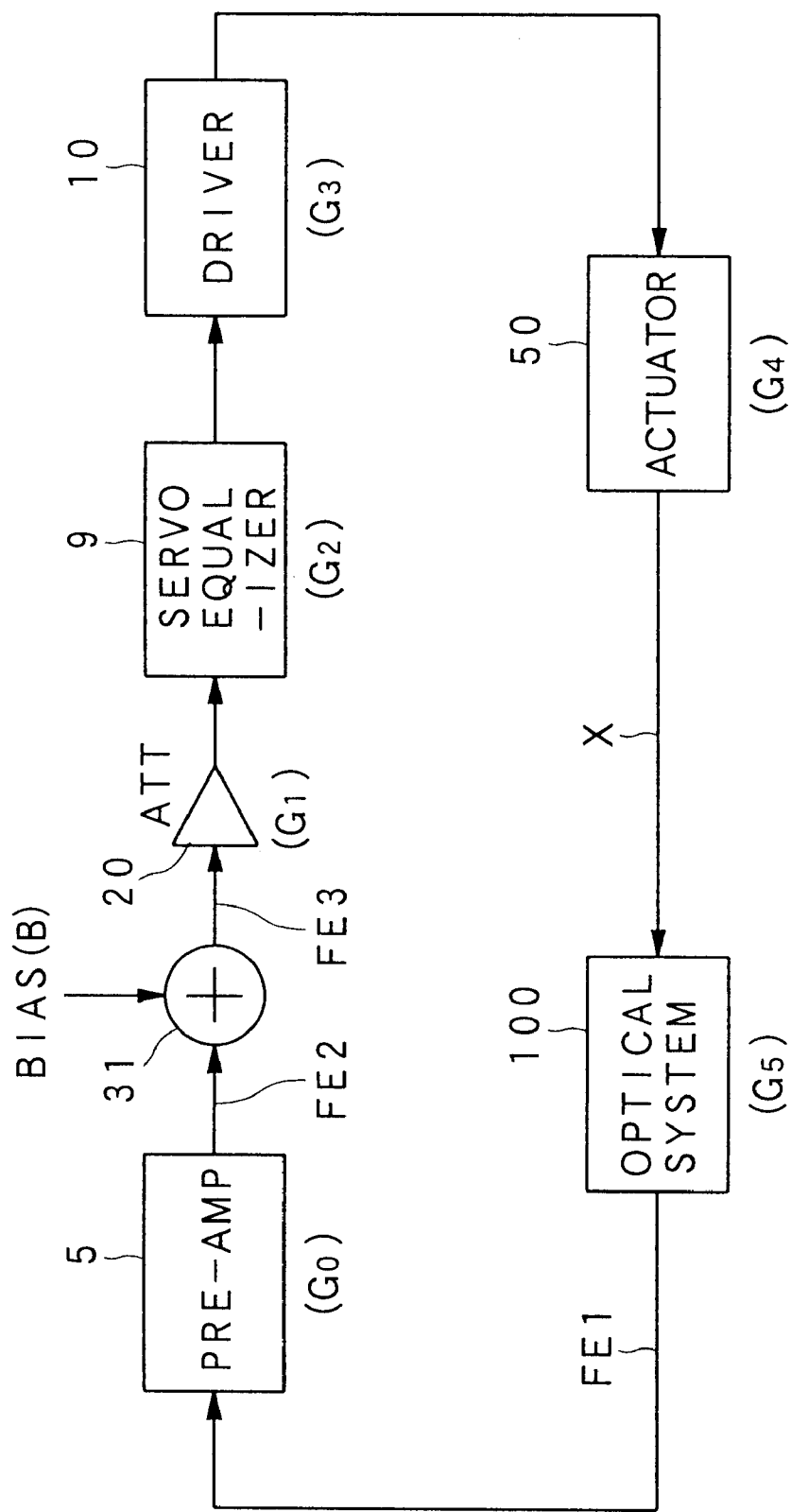
FIG. 8 is a schematic block diagram showing a configuration of a focus servo loop in the third embodiment.

Further, in FIG. 8, it is assumed that the pre-amplifier 5B has a gain $G_0$ as a gain parameter, the attenuator 20 has a gain $G_1$, the servo equalizer 9 has a gain $G_2$, the driver 10 has a gain $G_3$, the actuator 50 has a gain $G_4$ and the whole optical system 100 has a gain $G_5$ as a sensitivity parameter. Here, the gain $G_5$ as for the whole optical system 100 indicates a total sensitivity gain of the optical detector D, the objective lens 2a, the deviation beam splitter, the quarter wave length plate and the like included in the optical system. As a result, the sensitivity gain $G_5$ includes gain components changed on the basis of the influence that variations of the reflectance factor of the actually reproduced MD 120 and the like have with respect to the focus error signal $S_{FE}$.

Among the respective gains, the gain $G_0$ of the pre-amplifier SB, the gain $G_3$ of the driver 10 and the gain $G_5$ of the whole optical system 100 may be considered to be changed by the variation for each manufactured product, aging and the like. However, since the gain $G_3$ of the driver 10 among them is small in the change width (actually, equal to or less than ±2 dB), the gain $G_0$ of the pre-amplifier 5B and the gain $G_5$ of the whole optical system 100 may be considered to be predominantly changed by the variation for each product, the aging and the like. Among the optical elements included in the whole optical system 100, factors which have influence on the change of the gain $G_5$ are actually contamination onto a lens surface of the objective lens 2a, or slight displacement of the optical axis of each optical component due to vibration and the like.

A relationship between the respective control amounts and the respective gains in the focus servo loop shown in FIG. 8, can be evident from FIG. 8, as following equations (1) and (2).

$$FE3 = FE2 + B \quad (1)$$

$$FE2 = FE3 \times (G_1 \times G_2 \times G_3 \times G_4 \times G_5 \times G_0) \quad (2)$$

Assuming that an open loop gain is Gop when the focus servo loop shown in FIG. 8 is open, since $$Gop = G_1 \times G_2 \times G_3 \times G_4 \times G_5 \times G_0$$

Thus, from this equation and the equation (2), then:

$$FE2 = FE3 \times Gop \quad (3)$$

And, from the equations (1) and (3), then:

$$FE2 = B \times Gop/(1 - Gop)$$

$$= B/(1/Gop - 1) \quad (4)$$

Now, in a case of considering a direct current component (DC component) of the gain in the focus servo loop, since $$Gop \gg 1,$$

from this expression and the equation (4), then:

$$1/Gop \approx 0$$

At last, then:

$$FE2 = -B \quad (5)$$

From the equation (5), if the bias voltage B is changed, the FE2 is changed. Further, from FIG. 8, then:

$$X = FE2/(G_5 \times G_0) \quad (6)$$

Thus, if the FE2 is changed, a position X of the objective lens 2a is changed.

As can be evident from the above mentioned explanations, it is possible to control the bias voltage B in the focus servo loop to thereby control the error and position from the information record surface of the focus point of the light beam.

Incidentally, from the equations (5) and (6), then:

$$|B| = |X \times G_5 \times G_0| \quad (7)$$

Thus, from the equation (7), if knowing the position of the objective lens 2a and the gains of the pre-amplifier 5B and the whole optical system 100 (i.e. the gains $G_0$ and $G_5$), it is possible to determine the bias voltage B. And, in a case of considering the position X of the objective lens 2a by displacing it to an error amount x from a predetermined standard position, the bias voltage B is shown below:

$$|B| = |x \times G_5 \times G_0| \quad (8)$$

Thus, the bias voltage B shown in the above expression (8) indicates a changing amount (adjusting amount) from a predetermined standard bias voltage.

While taking account of a fact that the position X of the objective lens 2a can be controlled by changing the bias voltage B as mentioned above, and operations of the MD reproducing apparatus S having the configurations shown in FIGS. 6 and 7 is explained with reference to FIGS. 9 to 13 (mainly as for a process of setting the optimum bias voltage in the MD reproducing apparatus S). In the operations of the MD reproducing apparatus S described below, in parallel to a bias voltage calculating process of the focus error signal $S_{FE}$, the automatic gain control of the focus servo loop is performed by the attenuator 20 and the gain change amount detecting units 21 and 21'.

At first, a whole operation among the operations of the MD reproducing apparatus S is explained with reference to FIG. 9. The operations shown in FIGS. 9 and 10 are mainly performed under the control of the micro computer 6.

Figure 9:
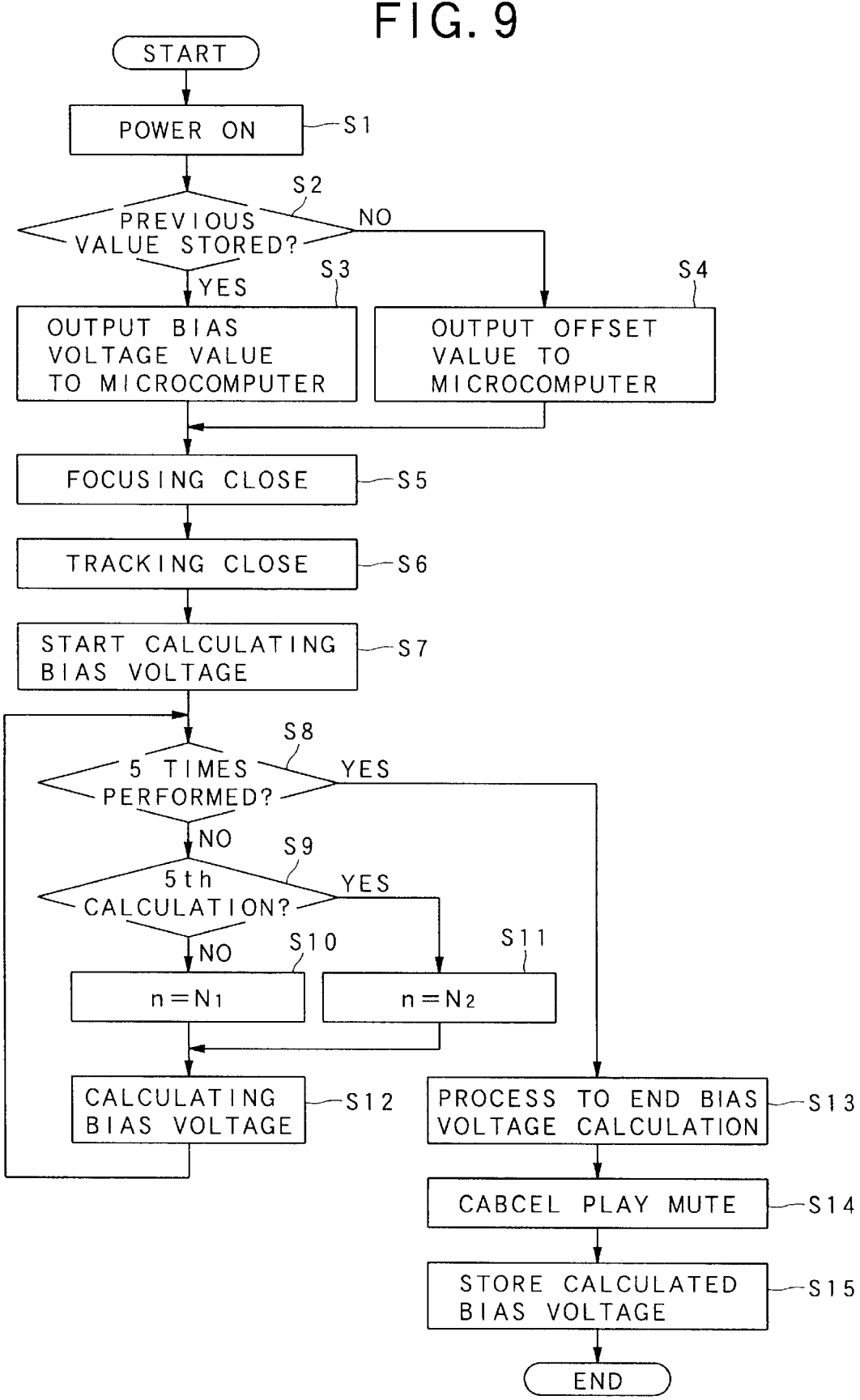
FIG. 9 is a flow chart showing a whole operation of the MD reproducing apparatus in the third embodiment.

As shown in a flow chart of FIG. 9, in the MD reproducing apparatus S of this embodiment, when a power supply is firstly turned on (Step S1), it is judged whether or not a bias voltage set at a time of setting a previous bias voltage is stored in the memory 13 (Step S2). If stored (Step S2; YES), its value is outputted to the micro computer 6 (Step S3). On the other hand, if the previous bias voltage is not stored in the memory 13 (Step S2; NO), an electric offset value of the bias voltage set on the basis of the output signal from the pre-amplifier 5 before setting the bias voltage is outputted to the micro computer 6 (Step S4).

Next, in order to perform the focus servo control by rotating the MD 120 and focusing the light beam B on the information record surface of the MD 120, the focus servo loop shown in FIG. 8 is closed by the operation of the servo equalizer 9 under the control of the micro computer 6 (Step S5). Next, in order to perform the tracking servo control for making the light beam B follow on the information track of the micro computer 6, the tracking servo loop is closed by the operation of the servo equalizer 9 under the control of the micro computer 6 (Step S6).

After that, in order to perform the bias voltage calculating process in accordance with the present invention, various values necessary for the calculating process are set in the micro computer 6, the servo equalizer 9 and the like (Step S7).

Next, it is judged whether or not the adjustment of the bias voltage is performed five times (Step S8). This judgment is the process to set a final bias voltage after the same setting process (a step S12 described later) is repeated five times, in order to improve an accuracy of the set bias voltage.

If the bias voltage setting process is not performed five times (Step S8; NO), it is judged whether or not it is the fifth (final) bias voltage setting process (Step S9). If it is not the fifth (final) bias voltage setting process (Step S9; NO), a sample number n to be used at the bias voltage calculating process (Step S12) described later is set as $n=N_1$ to correspond to a sample position which is distributed within a distance less than one round in the MD 120 (Step S10) (at the step S12, in order to improve the calculating accuracy, the bias voltage is calculated on the basis of the error amount from the position of the information record surface of the focus point of the light beam B at a different position (hereafter, referred to as a "sample") on the MD 120).

On the other hand, if it is the fifth (final) bias voltage setting process in the process at the step S9 (Step S9; YES), the sample number n to be used in the bias voltage calculating process (Step S12) is set as $n=N_2$ (at this time, $N_1<N_2$) in order to detect the error amount at the sample position which is distributed within a distance equal to or more than the one round in the MD 120 (Step S11). Here, the $N_2$ samples are distributed at the distances equal to or more than the one round in the MD 120. When the sample number is set to the $N_2$ at the step S11, the error amount from the position of the information record surface of the focus point of the light beam B can be determined from the samples distributed at the distances equal to or more than the one round in the MD 120. Thus, it is possible to set the bias voltage in which the influence of a so-called surface distortion in the MD 120 (distortion over the MD 120) is considered.

After the sample number n is set at the step S10 or S11, the bias voltage calculating process in accordance with the present invention is performed (Step S12). Detailed portions of the bias voltage calculating process at the step S12 are described later.

After the bias voltage calculating process is performed at the step S12, the flow returns to the step S8 in order to repeat the bias voltage calculating process until five times.

On the other hand, if the bias voltage setting process is performed five times at the step S8 (Step S8; YES), processes required to end the bias voltage calculating process are performed in the servo equalizer 9, the micro computer 6 and the like (Step S13). Then, a play mute is canceled, and the RF signal $S_{RF}$ is outputted to the signal processing unit 7, and thereby the reproduction is started (Step S14). Further, the value of the bias voltage calculated by the processes at the steps S8 to S12 is stored into the memory 13 (Step S15) so as to prepare a next reproduction process, and then the process is ended.

The bias voltage calculating process at the step S12 in FIG. 9 is explained with reference to FIGS. 10 to 13.

In the bias voltage calculating process (Step S12) of the embodiment, the switch control signal Ssw is firstly outputted by the micro computer 6 to thereby control the switch SW to be closed, so as to superimpose the disturbance signal Sn through the adder 30 onto the focus error signal $S_{FE}$ (Step S20). Then, after waiting for stabilization of the error signal Sv outputted by the focus error detection circuit 26 (Step S21), a value of the error signal Sv (error voltage V) is measured by the micro computer 6 (Step S22). At this time, the error signal Sv has the error voltage V corresponding to the error amount between the focus point of the light beam B at each sample position on the MD 120 and the information record surface of the MD 120. Detection of the error voltage V at the step S22 will be explained later with reference to FIGS. 11 and 12.

After the error voltage V corresponding to the error amount between the focus point of the light beam B and the information record surface of the MD 120 is measured on the basis of the error signal Sv from the focus error detection circuit 26 (Step S22), if the measured error voltage V is larger than the maximum value Vmax of the error voltages V detected in the previous measurements at the other sample positions, the currently measured error voltage V is stored as the maximum value Vmax. Further, if the measured error voltage V is smaller than the minimum voltage Vmin of the previously detected error voltages V at the other sample positions, the currently measured error voltage V is stored as the minimum value Vmin (Step S23). The process at the step S23 is a process of updating and storing the maximum value Vmax and the minimum value Vmin so as to calculate an average value between the maximum value and the minimum value at a later process (Step S25).

After the maximum value Vmax and the minimum value Vmin of the error voltages V are updated (Step S23), it is judged whether or not a value of a counter (included in the micro computer 6) for counting a detection number (detected sample number) of the error amounts (error voltages V) at one bias voltage calculating process is equal to or more than "$N_1$" or "$N_2$" indicating the total number of the samples (Step S24). If the value of the counter is equal to or more than the total number of the samples (Step S24; YES), in order to calculate the final error voltage V at the present bias voltage calculating process, the final error voltage V is determined from the maximum value Vmax and the minimum value Vmin of the previously stored error voltages V, as the average value thereof (Step S25).

By use of the error voltage V calculated at the step S25, an adjusting amount A of the bias voltage is calculated by the following equation.

$$\Delta = (V/a) \times (G_0 \times G_S) \quad (9)$$

wherein a is a constant coefficient (refer to FIG. 12) indicating a relationship between the error amount from the information record surface of the focus point of the light beam B and the error voltage V. The adjusting amount Δ at the equation (9) will be detailed later.

After the adjusting amount Δ of the bias voltage is calculated (Step S26), the value is added to a bias voltage B' up to that time and accordingly the final bias voltage B is obtained (Step S27). Then, it is outputted to the adder 31 as the bias control signal Sb and superimposed onto the focus error signal $S_{FE}$. When the switch control signal Ssw is outputted by the micro computer 6, the switch SW is opened, and thereby the superimposing process of the disturbance signal Sn on the focus error signal $S_{FE}$ is stopped (Step S28). Then, the bias voltage calculating process is ended.

On the other hand, if the value of the counter is not equal to or more than the total number of the samples in the process at the step S24 (Step S24; NO), the value of the counter is incremented by "1" (Step S29). The operation is in a standby state (Step S30) while a light spot is moved to a next sample. The operation is returned to the step S22 in order to use the next sample to thereby detect the error voltage V.

The detection of the error amount at the step S22 is explained with reference to FIGS. 11A, 11B and 12.

As shown in FIG. 11A, when closing the focus servo loop (Step S5 in FIG. 9) and also closing the tracking servo loop (Step S6 in FIG. 9) and then superimposing the disturbance signal Sn onto the focus error signal $S_{FE}$ (Step S20 in FIG. 10) to thereby perform the focus servo control, the objective lens 2a is vibrated in a direction perpendicular to an information record surface P at a distance (shown by a symbol λ in FIG. 11A) and a period corresponding to an amplitude and a frequency of the superimposed disturbance signal Sn. At this time, the focus point of the light beam B is fluttered at a position shown in each cases (A) to (C) of FIG. 11A corresponding to the error amount between the focus point and the information record surface P. At this time, each of the RF signals $S_{RF}$ as a disturbance detection signal inputted to the focus error detection circuit 20 has a wave form as shown in FIG. 11A. That is, in a case (A) that the light beam B is focused ahead of the information record surface P (i.e., focused at a shallower position) because of the distortion of the bias voltage in the focus error signal $S_{FE}$, the RF signal $S_{RF}$ is changed in amplitude under the same phase as the disturbance signal Sn, and further the amplitude becomes higher. In a case (C) that the light beam B is focused at a deeper position than the information record surface P because of the distortion of the bias voltage in the focus error signal $S_{FE}$, the RF signal $S_{RF}$ is changed in amplitude under the phase opposite to that of the disturbance signal Sn, and further the amplitude becomes higher. Moreover, in a case (B) that the focus point of the light beam B substantially coincides with the position of the information record surface P, the RF signal $S_{RF}$ is changed in amplitude under a frequency two times the disturbance signal Sn, and further the amplitude (changed width of the RF signal $S_{RF}$) becomes the minimum.

The reason why the frequency and the amplitude of the RF signal $S_{RF}$ are changed on the basis of the distance from the focus point of the light beam B to the information record surface P is explained with reference to FIG. 11B. A second order curve which is opened downward in FIG. 11B shows a mutual relationship between the distance from the focus point of the light beam B to the information record surface P as a horizontal axis in the optical pickup 102 and the strength of the corresponding RF signal $S_{RF}$ as a vertical axis.

As can be evident from FIG. 11B, in the case (A) that the focus point of the light beam B is located ahead of the information record surface P, when the focus point of the light beam B is fluttered at the period and the amplitude corresponding to the disturbance signal Sn, the wave form of the outputted RF signal $S_{RF}$ has the same phase as that of the disturbance signal Sn, and the amplitude thereof becomes higher. In the case (C) that the focus point of the light beam B is deeper than the information record surface P, when the focus point of the light beam B is fluttered at the period and the amplitude corresponding to the disturbance signal Sn, the wave form of the outputted RF signal $S_{RF}$ has the phase opposite to the disturbance signal Sn, and the amplitude thereof becomes higher. Moreover, in the case (B) that the focus point of the light beam B substantially coincides with the position of the information record surface P, the period of the detected RF signal $S_{RF}$ becomes two times the disturbance signal Sn, and the amplitude becomes the minimum.

Thus, by detecting the amplitude of the RF signal $S_{RF}$ when superimposing the disturbance signal Sn on the focus error signal $S_{FE}$ by the focus error detection circuit 26, it is possible to determine the error amount x between the focus point of the light beam B and the position of the information record surface P. This results in the output of the error signal Sv having the error voltage V corresponding to the error amount x. Here, it is known that a relationship between the error amount x, between the focus point of the light beam B and the position of the information record surface P, and the corresponding error voltage V is changed in a form of a first order function as shown in FIG. 12.

Further, by comparing the phase of the RF signal $S_{RF}$ with that of the focus error signal $S_{FE}$ (on which the disturbance signal Sn is superimposed) inputted to the focus error detection circuit 26, it is possible to judge whether or not the relationship between the focus point of the light beam B and the position of the information record surface P corresponds to the case (A) or the case (C) shown in FIG. 11A. This is outputted as a difference of a polarity of the error signal Sv.

The adjusting amount Δ calculated at the step S26 is explained.

The adjusting amount A is expressed by the equation (9).

$$\Delta = (V/a) \times (G_0 \times G_S) \quad (9)$$

Figure 12:
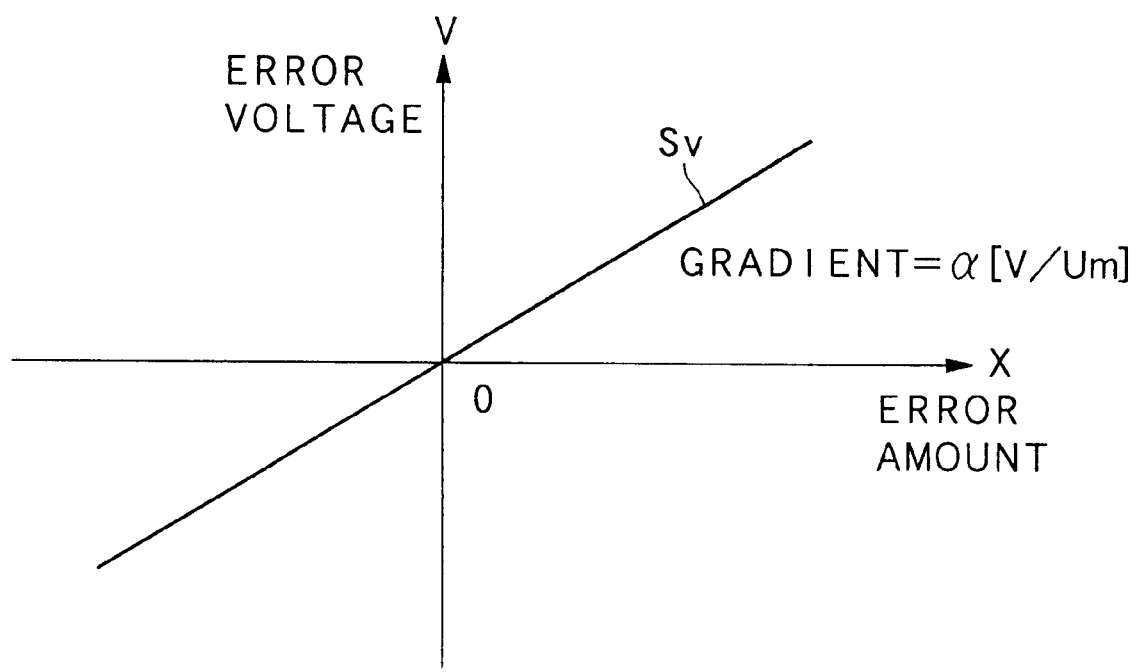
FIG. 12 is a graph showing a relationship between an error amount and an error voltage.

As shown in FIG. 12, there is a relationship between the error voltage V and the error amount x, between the focus point of the light beam B and the position of the information record surface, at the equation (9), as a following equation (10).

$$V = a \times x \quad (10)$$

Thus, when the equation (8) is re-written by using the equation (10), the adjusting amount $\Delta$ is expressed in the following manner by the equation (9).

$$\Delta = x \times G_5 \times G_0$$

$$= (V/a) \times (G_5 \times G_0) \qquad (9)$$

Namely, it is concluded that the adjusting amount $\Delta$ is given by the equation (9).

Next, a method of actually calculating the adjusting amount $\Delta$ is explained.

At first, for the item (V/a) (i.e. the error amount x), as shown in FIGS. 11A, 11B and 12, the voltage (error voltage) V of the error signal Sv outputted by the focus error detection circuit 26 is detected by the micro computer 6. This is divided by the constant a (in other words, a sensitivity of the focus error detection circuit 26) which is known in advance from the relationship shown in FIG. 12, so that the adjusting amount $\Delta$ can be calculated.

The calculating process of the item $(G_5 \times G_0)$ is explained.

There are two methods of calculating the value $(G_5 \times G_0)$, as shown below.

Figure 13:
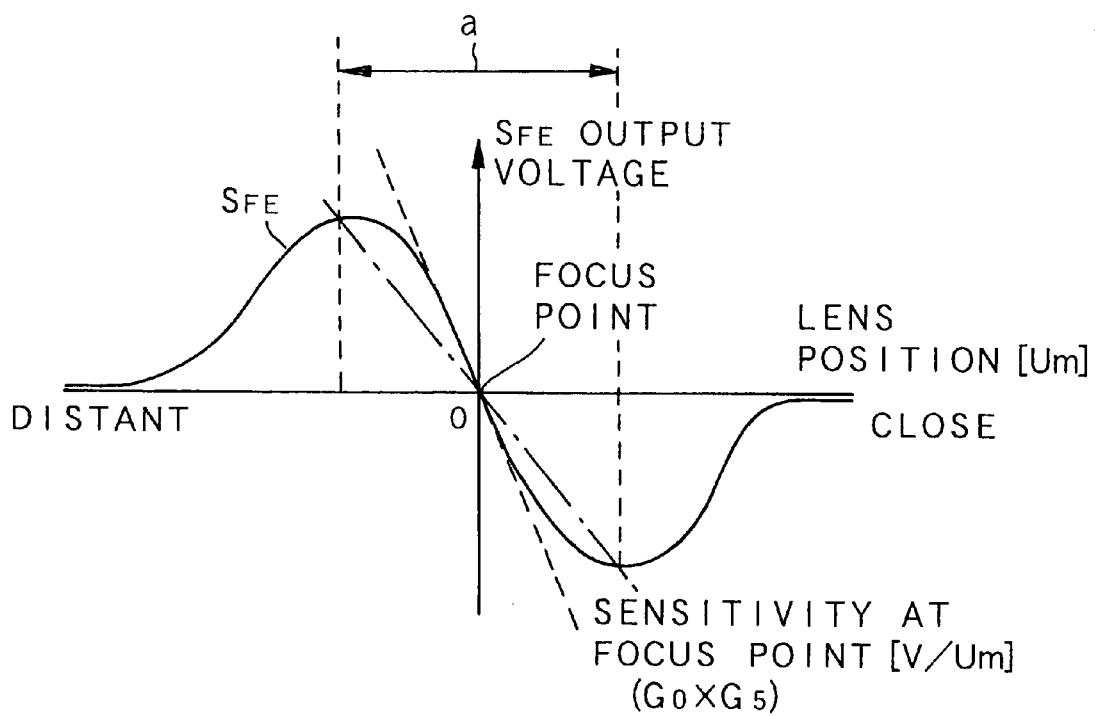
FIG. 13 is a graph showing a relationship between a focus error signal and a value of $(G_0 \times G_5)$.
Figure 14:
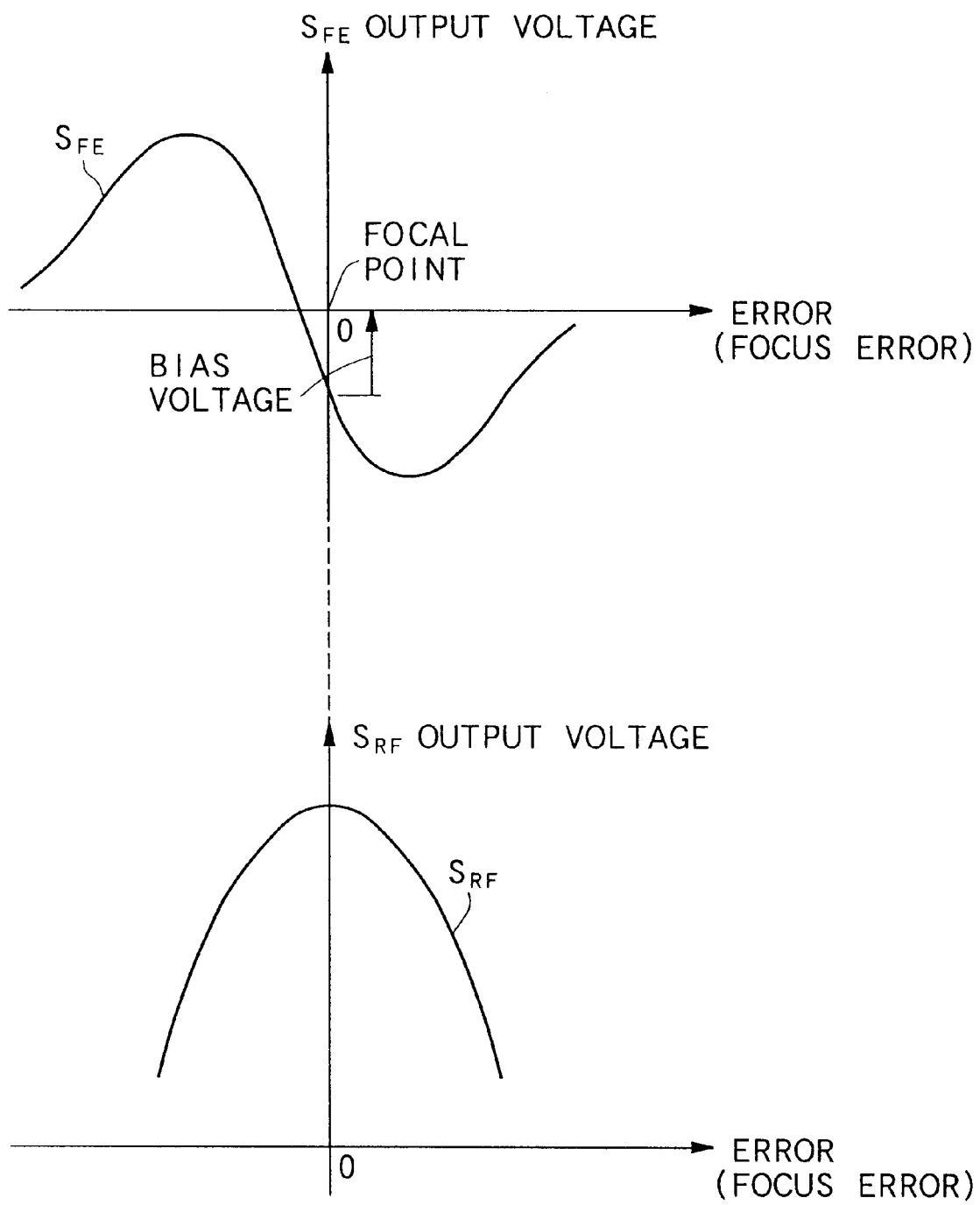
FIG. 14 are graphs showing a variation of the focus error signal.

(IV) Method of Calculating on the Basis of the Focus Error Signal $S_{FE}$ Generated in the Focus Search Operation At first, a method of calculating the value of the $(G_5 \times G_0)$ (at a dimension of [V/m]) on the basis of the focus error signal $S_{FE}$ generated in the focus search operation is explained with reference to FIG. 13. The focus search operation means an operation of setting a standard position of a focus point of a light beam in the focus servo control before performing the focus servo operation.

It is known that the sensitivity at the focus point of the focus error signal $S_{FE}$ generated in the focus search operation (that is, a gradient of the focus error signal $S_{FE}$ at the focus point) corresponds to the value $(G_5 \times G_0)$.

On the other hand, the followings are also known. That is, a distance $\alpha$ that the objective lens 2a moves while two peak values (an upper peak value and a lower peak value) in the focus error signal $S_{FE}$ shown in FIG. 13 are detected is constant in the optical system of the MD reproducing apparatus S. Further, a gradient of a straight line (shown by a dashed line in FIG. 13) connecting between the peak points corresponding to the two peak values in the focus error signal $S_{FE}$ is proportional to the gradient of the focus error signal $S_{FE}$ at the focus point.

Therefore, if measuring the amplitude (p-p value) of the focus error signal $S_{FE}$ in the focus search operation, assuming that b is a proportional constant in the proportional relationship between the gradient of the straight line connecting between the peak points corresponding to the two peak values in the focus error signal $S_{FE}$ and the gradient of the focus error signal $S_{FE}$ at the focus point, the value $(G_5 \times G_0)$ can be calculated as a following equation (11) as the gradient of the focus error signal $S_{FE}$ at the focus point.

$$G_5 \times G_0 = ([\text{p-p Value of Focus Error Signal } S_{FE}]/\alpha) \times b \qquad (11)$$

As a result, the value $(G_5 \times G_0)$ can be calculated on the basis of the relation of the equation (11), by measuring in advance the relationship between the amplitude (p-p value) of the focus error signal $S_{FE}$ and the value $(G_5 \times G_0)$ at a time of manufacturing and the like to thereby determine the constants $\alpha$ and b, and by detecting the amplitude (p-p value) of the focus error signal $S_{FE}$ later in the focus search operation.

(V) Method of Calculating on the Basis of the Automatically Controlled Gain

Next, a method of calculating the value $(G_5 \times G_0)$ on the basis of an automatically controlled gain of the focus servo loop is explained.

As mentioned above, the variation of the gain $G_0$ of the pre-amplifier 5B in the focus servo loop shown in FIG. 8 may result from an initial adjustment deviation (at a time of manufacturing) in many cases. On the other hand, the variation of the gain $G_5$ of the whole optical system may sometimes result from the aging in addition to the initial adjustment deviation. Thus, it is considered that the variation of the gain when automatically adjusting the gain of the focus servo loop practically results from the gain $G_0$ of the pre-amplifier 5B and the gain $G_5$ of the whole optical system.

In a case of automatically adjusting the gain of the focus servo loop (AGC automatic adjustment), the attenuator 20 is controlled by the gain control signal Satt (refer to FIG. 7) from the micro computer 6, and thereby the gain $G_1$ shown in FIG. 8 is changed. Thus, to perform the AGC automatic adjustment by means of the AGC process such that the gain of the focus servo loop is constant is equivalent to making the value $(G_0 \times G_1 \times G_5)$ constant as a result. Therefore, the following equation is established:

[Design Standard Value of Value $G_1$]/[Value $G_1$ After Automatic Adjustment]=[Present Value of$(G_0 \times G_5)$]/[Design Standard Value of Value$(G_0 \times G_5)$] \qquad (12)

From the equation (12), then:

[Present Value of $(G_0 \times G_5)$]=([Design Standard Value of Value $G_1$]/[Value $G_1$ After Automatic Adjustment])×[Design Standard Value of Value $(G_0 \times G_5)$] \qquad (13)

The design standard value is a standard value with respect to the design set when manufacturing the MD reproducing apparatus S. Once this standard value is set, it is stored in the micro computer 6, and never changed or updated after that.

The present value of the $(G_0 \times G_5)$ can be determined from the value of the gain $G_1$ after the AGC automatic adjustment, on the basis of the design standard value of the value of the gain $G_1$ and the design standard value of the value $(G_0 \times G_5)$ which are stored, from the equation (13).

In a case of comparing the methods shown in (IV) and (V) with each other, since the method shown in (IV) calculates the value $(G_0 \times G_5)$ from the S curve, it can simplify the calculating process. However, it requires a time to measure the S curve. In contrast with this, if the method shown in (V) calculates the bias voltage in parallel to performing the AGC automatic adjustment, it can use the result of the AGC automatic adjustment to calculate the value $(G_0 \times G_5)$. Therefore, the process can be performed faster in the method shown in (V).

Since the value (V/a) and the value $(G_0 \times G_5)$ can be calculated by the above mentioned respective methods, from these values it is possible to calculate the adjusting amount $\Delta$ at the step S26. After that, it is possible to finally calculate the bias voltage at the step S27.

As explained above, according to the process of the bias voltage controlling apparatus of the focus error signal $S_{FE}$ in the embodiment, the bias voltage is calculated on the basis of the error amount x between the focus point of the light beam B when the disturbance signal Sn is superimposed and the position of the information record surface, the gain $G_0$ of the pre-amplifier 5B in the focus servo loop and the gain (sensitivity) $G_5$ in the whole optical system. As a result, it is possible to perform the bias voltage control in the focus error signal $S_{FE}$ automatically in a short time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-286578 filed on Oct. 7, 1999 including the specification, claims, drawings and summary is incorporated herein by reference in its entirety.

What is claimed is:

1. A bias voltage controlling apparatus for controlling a bias voltage for a focus servo control to control a position of a focal point of a light beam, which is irradiated onto an information record surface of an information record medium, in a direction perpendicular to the information record surface, said bias voltage controlling apparatus comprising:

a distinguishing device for distinguishing a type of said information record medium; and a controlling device for optimally controlling the bias voltage on the basis of the type of said information record medium distinguished by said distinguishing device, wherein said controlling device controls the bias voltage so as to reduce a change of a reflection light signal, which is generated in correspondence with a reflection light of the light beam reflected from the information record surface, on a time axis on the basis of the type of said information record medium distinguished by said distinguishing device, and wherein said controlling device comprises:

a first controlling device for controlling the bias voltage so as to maximize a level of the reflection light signal; and a second controlling device for controlling the bias voltage so as to reduce the change of the reflection light signal on the time axis, on the basis of the type of said information record medium distinguished by said distinguishing device, after the level of the reflection light signal is maximized by said first controlling device.

2. A bias voltage controlling apparatus according to claim 1, wherein said controlling device comprises:

a setting device for setting a control target value for a control of the bias voltage so as to reduce the change of the reflection light signal on the time axis, in correspondence with the type of said information record medium distinguished by said distinguishing device; and a convergence controlling device for controlling the bias voltage so as to converge the bias voltage to the set control target value.

3. A bias voltage controlling apparatus according to claim 1, wherein said controlling device controls the bias voltage so as to minimize the change of the reflection light signal on the time axis.

4. A bias voltage controlling apparatus according to claim 1, wherein said distinguishing device judges whether the type is an exclusive for reproduction type or a recordable type.

5. A bias voltage controlling apparatus according to claim 4, wherein said information record medium comprises an optical disc exclusive for reproduction or a recordable optical disc.

6. An information reproducing apparatus comprising:

(i) a bias voltage controlling apparatus for controlling a bias voltage for a focus servo control to control a position of a focal point of a light beam, which is irradiated onto an information record surface of an information record medium, in a direction perpendicular to the information record surface, said bias voltage controlling apparatus comprising:

a distinguishing device for distinguishing a type of said information record medium; and a controlling device for optimally controlling the bias voltage on the basis of the type of said information record medium distinguished by said distinguishing device, (ii) a light emitting device for emitting the light beam onto the information record surface in accordance with the controlled bias voltage, and (iii) a reproducing device for reproducing information recorded on said information record surface on the basis of the reflection light signal, wherein said controlling device controls the bias voltage so as to reduce a change of a reflection light signal, which is generated in correspondence with a reflection light of the light beam reflected from the information record surface, on a time axis on the basis of the type of said information record medium distinguished by said distinguishing device, and wherein said controlling device comprises:

a first controlling device for controlling the bias voltage so as to maximize a level of the reflection light signal; and a second controlling device for controlling the bias voltage so as to reduce the change of the reflection light signal on the time axis, on the basis of the type of said information record medium distinguished by said distinguishing device, after the level of the reflection light signal is maximized by said first controlling device.

7. An information recording apparatus comprising:

(i) a bias voltage controlling apparatus for controlling a bias voltage for a focus servo control to control a position of a focal point of a light beam, which is irradiated onto an information record surface of an information record medium, in a direction perpendicular to the information record surface, said bias voltage controlling apparatus comprising:

a distinguishing device for distinguishing a type of said information record medium; and a controlling device for optimally controlling the bias voltage on the basis of the type of said information record medium distinguished by said distinguishing device, and (ii) a recording device for emitting the light beam, which corresponds to record information to be recorded, onto the information record surface in accordance with the controlled bias voltage, to thereby record the record information onto said information record surface, wherein said controlling device controls the bias voltage so as to reduce a change of a reflection light signal, which is generated in correspondence with a reflection light of the light beam reflected from the information record surface, on a time axis on the basis of the type of said information record medium distinguished by said distinguishing device, and wherein said controlling device comprises:

a first controlling device for controlling the bias voltage so as to maximize a level of the reflection light signal; and a second controlling device for controlling the bias voltage so as to reduce the change of the reflection light signal on the time axis, on the basis of the type of said information record medium distinguished by said distinguishing device, after the level of the reflection light signal is maximized by said first controlling device.

* * * * *